(12) United States Patent
Ogura et al.

(10) Patent No.: US 11,940,275 B2
(45) Date of Patent: Mar. 26, 2024

(54) VIBRATOR DEVICE, ELECTRONIC APPARATUS, AND VEHICLE

(71) Applicant: Seiko Epson Corporation, Tokyo (JP)

(72) Inventors: Seiichiro Ogura, Minowa (JP); Keiichi Yamaguchi, Ina (JP); Ryuta Nishizawa, Nagano (JP)

(73) Assignee: SEIKO EPSON CORPORATION (JP)

( * ) Notice: Subject to any disclaimer, the term of this patent is extended or adjusted under 35 U.S.C. 154(b) by 3 days.

(21) Appl. No.: 17/718,418

(22) Filed: Apr. 12, 2022

(65) Prior Publication Data

US 2022/0236057 A1 Jul. 28, 2022

Related U.S. Application Data

(63) Continuation of application No. 16/941,655, filed on Jul. 29, 2020, now Pat. No. 11,326,882.

(30) Foreign Application Priority Data

Jul. 30, 2019 (JP) ................................. 2019-139663

(51) Int. Cl.
*G01C 19/5642* (2012.01)
*B60R 16/023* (2006.01)
(Continued)

(52) U.S. Cl.
CPC ........ *G01C 19/5642* (2013.01); *B60R 16/023* (2013.01); *G01C 19/56* (2013.01);
(Continued)

(58) Field of Classification Search
CPC G01C 19/5642; G01C 19/56; G01C 19/5607; G01C 19/5656; B60R 16/023; G01P 15/18
(Continued)

(56) References Cited

U.S. PATENT DOCUMENTS 5,617,315 A 4/1997 Nakao et al.
5,918,280 A 6/1999 Gang et al.
(Continued)

FOREIGN PATENT DOCUMENTS

CN 102192731 A * 9/2011 ......... G01C 19/5607
CN 110333370 A * 10/2019 ......... G01C 19/5607
(Continued)

*Primary Examiner* — Stephanie E Bloss
*Assistant Examiner* — Kevin C Butler
(74) *Attorney, Agent, or Firm* — Harness, Dickey & Pierce, P.L.C.

(57) ABSTRACT

A vibrator device includes a vibrator element, and a support substrate configured to support the vibrator element. The vibrator element includes a drive arm provided with a drive signal electrode and a drive constant-potential electrode, and a detection arm provided with a detection signal electrode and a detection constant-potential electrode. The support substrate includes a base, and a drive signal interconnection electrically coupled to the drive signal electrode, a drive constant-potential interconnection electrically coupled to the drive constant-potential electrode, and a detection signal interconnection electrically coupled to the detection signal electrode all provided to the base, and the drive arm includes a first surface located at the support substrate side, and a second surface located at an opposite side to the first surface. Further, the drive constant-potential electrode is disposed on the first surface, and the drive signal electrode is disposed on the second surface.

9 Claims, 18 Drawing Sheets

(51) Int. Cl.
  *G01C 19/56* (2012.01)
  *G01C 19/5607* (2012.01)
  *G01C 19/5656* (2012.01)
  *G01P 15/18* (2013.01)
(52) U.S. Cl.
  CPC ..... *G01C 19/5607* (2013.01); *G01C 19/5656* (2013.01); *G01P 15/18* (2013.01)
(58) Field of Classification Search
  USPC ...................................................... 73/504.15
  See application file for complete search history.

(56) References Cited

U.S. PATENT DOCUMENTS

| | | | |
|---|---|---|---|
| 6,122,962 A | 9/2000 | Yoshino et al. | |
| 6,257,058 B1 * | 7/2001 | Murata | G01C 19/5607 73/504.16 |
| 6,490,925 B2 | 12/2002 | Inoue et al. | |
| 7,168,289 B2 | 1/2007 | Kikuchi | |
| 7,207,221 B2 | 4/2007 | Kawauchi et al. | |
| 7,255,005 B2 | 8/2007 | Ogura | |
| 8,230,740 B2 | 7/2012 | Katsuki et al. | |
| 8,375,790 B2 | 2/2013 | Sato et al. | |
| 8,511,161 B2 | 8/2013 | Amemiya | |
| 9,140,549 B2 | 9/2015 | Ichikawa et al. | |
| 9,927,238 B2 | 3/2018 | Takada et al. | |
| 10,690,500 B2 | 6/2020 | Nishizawa et al. | |
| 2001/0020388 A1 * | 9/2001 | Inoue | G01C 19/5607 73/514.12 |
| 2005/0056095 A1 | 3/2005 | Tomikawa et al. | |
| 2006/0070442 A1 * | 4/2006 | Kawauchi | G01C 19/5628 29/25.35 |
| 2006/0162446 A1 * | 7/2006 | Ogura | G01C 19/5607 73/504.12 |
| 2008/0178673 A1 * | 7/2008 | Tateyama | G01C 19/5607 73/504.15 |
| 2010/0024547 A1 * | 2/2010 | Katsuki | G01C 19/5719 73/504.12 |
| 2010/0326189 A1 | 12/2010 | Sato et al. | |
| 2011/0179867 A1 * | 7/2011 | Amemiya | G01C 19/5607 73/504.12 |
| 2011/0202300 A1 | 8/2011 | Udagawa et al. | |
| 2012/0216613 A1 * | 8/2012 | Honda | G01C 19/5747 73/504.15 |
| 2013/0036819 A1 | 2/2013 | Ichikawa et al. | |
| 2013/0055810 A1 | 3/2013 | Yanagisawa et al. | |
| 2013/0055815 A1 | 3/2013 | Yanagisawa et al. | |
| 2013/0312519 A1 | 11/2013 | Ichikawa | |
| 2014/0283602 A1 | 9/2014 | Yamamoto | |
| 2014/0312437 A1 | 10/2014 | Matsukawa | |
| 2015/0114117 A1 | 4/2015 | Nakagawa | |
| 2015/0162522 A1 | 6/2015 | Ogura et al. | |
| 2016/0116287 A1 | 4/2016 | Fujii et al. | |
| 2016/0123734 A1 | 5/2016 | Nakagawa et al. | |
| 2016/0126923 A1 | 5/2016 | Nakagawa et al. | |
| 2016/0204334 A1 | 7/2016 | Yamada et al. | |
| 2016/0265915 A1 | 9/2016 | Takada et al. | |
| 2016/0276990 A1 | 9/2016 | Aoyama | |
| 2016/0298964 A1 | 10/2016 | Ide | |
| 2017/0016725 A1 | 1/2017 | Shimizu et al. | |
| 2017/0276694 A1 | 9/2017 | Uehara | |
| 2018/0274921 A1 | 9/2018 | Matsukawa | |
| 2018/0274922 A1 | 9/2018 | Nishizawa et al. | |
| 2018/0283865 A1 | 10/2018 | Nishizawa et al. | |
| 2019/0162745 A1 | 5/2019 | Otsuki et al. | |
| 2019/0170594 A1 | 6/2019 | Aoyama | |
| 2019/0229706 A1 | 7/2019 | Ogura et al. | |
| 2019/0257652 A1 | 8/2019 | Kameta | |
| 2019/0301868 A1 * | 10/2019 | Yamaguchi | G01C 19/5621 |
| 2019/0301869 A1 | 10/2019 | Sasaki et al. | |
| 2020/0200533 A1 | 6/2020 | Sasaki et al. | |
| 2020/0284815 A1 | 9/2020 | Ogura et al. | |
| 2020/0292311 A1 | 9/2020 | Howell et al. | |
| 2020/0292314 A1 * | 9/2020 | Nishizawa | G01C 19/5656 |
| 2020/0309526 A1 * | 10/2020 | Nishizawa | G01C 19/5705 |
| 2021/0033395 A1 * | 2/2021 | Ogura | G01C 19/5656 |
| 2021/0033398 A1 * | 2/2021 | Nishizawa | G01C 19/5642 |
| 2021/0063155 A1 | 3/2021 | Ogura et al. | |
| 2021/0063156 A1 | 3/2021 | Oshio et al. | |
| 2021/0135652 A1 | 5/2021 | Ogura | |
| 2021/0231438 A1 | 7/2021 | Ogura et al. | |
| 2021/0285769 A1 | 9/2021 | Tanaka et al. | |
| 2022/0178694 A1 * | 6/2022 | Nishizawa | G01C 19/574 |
| 2022/0236057 A1 * | 7/2022 | Ogura | G01C 19/5642 |
| 2022/0236058 A1 * | 7/2022 | Nishizawa | G01C 19/5621 |

FOREIGN PATENT DOCUMENTS

| | | | | |
|---|---|---|---|---|
| CN | 112311348 A | * | 2/2021 | G01C 19/5621 |
| EP | 2784443 A1 | * | 10/2014 | G01C 19/5621 |
| JP | 2001255152 A | * | 9/2001 | G10C 19/5607 |
| JP | 3276214 B2 | * | 4/2002 | G10K 11/178 |
| JP | 3601822 B2 | * | 12/2004 | G01C 19/5607 |
| JP | 3702412 B2 | * | 10/2005 | G10C 19/5719 |
| JP | 3702607 B2 | * | 10/2005 | G10C 19/5719 |
| JP | 2006105614 A | * | 4/2006 | G01C 19/5607 |
| JP | 2006201118 A | * | 8/2006 | G10C 19/5607 |
| JP | 4163067 B2 | * | 10/2008 | G10C 19/5607 |
| JP | 2010117260 A | * | 5/2010 | G01B 21/045 |
| JP | 2011174914 A | * | 9/2011 | G01C 19/5607 |
| JP | 4893335 B2 | * | 3/2012 | G10C 19/5607 |
| JP | 5228675 B2 | * | 7/2013 | G10C 19/5719 |
| JP | 5368181 B2 | * | 12/2013 | G01C 19/56 |
| JP | 5638419 B2 | * | 12/2014 | G01C 19/5649 |
| JP | 5807344 B2 | * | 11/2015 | G01C 19/5747 |
| JP | 5870532 B2 | * | 3/2016 | G01C 19/5607 |
| JP | 5975601 B2 | * | 8/2016 | G01C 19/56 |
| JP | 2016166791 A | * | 9/2016 | |
| JP | 2017015584 A | * | 1/2017 | |
| JP | 2017-026336 A | | 2/2017 | |
| JP | 2018136255 A | * | 8/2018 | |
| JP | 2018-159674 A | | 10/2018 | |
| JP | 2021032841 A | * | 3/2021 | G01C 19/5621 |

* cited by examiner

VIBRATOR DEVICE, ELECTRONIC APPARATUS, AND VEHICLE

This application is a continuation of U.S. patent application Ser. No. 16/941,655 filed Jul. 29, 2020, which claims priority to Japanese Patent Application Number 2019-139663, filed Jul. 30, 2019, all of which are hereby expressly incorporated by reference herein in their entireties.

BACKGROUND

1. Technical Field

The present disclosure relates to a vibrator device, an electronic device, and a vehicle.

2. Related Art

In JP-A-2017-26336, there is described a vibrator device which is used as an angular velocity sensor, and has a vibrator element supported above a TAB substrate with a plurality of inner leads. The vibrator element has a drive arm and a detection arm, wherein the drive arm is provided with a drive signal electrode and a drive constant-potential electrode, and performs a drive vibration in response to a drive signal applied to the drive signal electrode, and the detection arm is provided with a detection signal electrode and a detection constant-potential electrode, and performs a detection vibration in response to inertia to thereby output a detection signal from the detection signal electrode. Meanwhile, the plurality of inner leads includes an inner lead for the drive signal electrode electrically coupled to the drive signal electrode, an inner lead for the drive constant-potential electrode electrically coupled to the drive constant-potential electrode, an inner lead for the detection signal electrode electrically coupled to the detection signal electrode, and an inner lead for the detection constant-potential electrode electrically coupled to the detection constant-potential electrode.

However, in the vibrator device described above, the inner lead for the detection signal electrode is disposed close to the drive signal electrode, and further, a member for shielding against an electric field such as a shield member does not exist therebetween. Therefore, capacitive coupling easily occurs between the inner lead for the detection signal electrode and the drive signal electrode, and there is a problem that the drive signal to be applied to the drive signal electrode is mixed as a noise into the detection signal via the inner lead for the detection signal electrode to degrade the detection accuracy of the angular velocity.

SUMMARY

A vibrator device according to an application example includes a vibrator element, and a support substrate configured to support the vibrator element, wherein the vibrator element includes a drive arm which is provided with a drive signal electrode and a drive constant-potential electrode, and performs a drive vibration in response to a drive signal applied to the drive signal electrode, and a detection arm which is provided with a detection signal electrode and a detection constant-potential electrode, and performs a detection vibration in accordance with a physical quantity of a detection target to thereby output a detection signal from the detection signal electrode, the support substrate includes a base, and a drive signal interconnection electrically coupled to the drive signal electrode, a drive constant-potential interconnection electrically coupled to the drive constant-potential electrode, and a detection signal interconnection electrically coupled to the detection signal electrode all provided to the base, the drive arm includes a first surface located at the support substrate side, and a second surface located at an opposite side to the first surface, the drive constant-potential electrode is disposed on the first surface, and the drive signal electrode is disposed on the second surface.

In the vibrator device according to the application example, the drive arm may have a third surface and a fourth surface which form a pair, and connect the first surface and the second surface to each other, and the drive constant-potential electrode may be disposed on the first surface, the third surface, and the fourth surface.

In the vibrator device according to the application example, the drive constant-potential electrode may be divided into a portion disposed on the first surface, a portion disposed on the third surface, and a portion disposed on the fourth surface.

In the vibrator device according to the application example, the first surface has a recess recessed toward the second surface, and the drive constant-potential electrode may be disposed in the recess.

In the vibrator device according to the application example, the detection signal interconnection may have a portion opposed to the drive arm.

In the vibrator device according to the application example, tip parts of the drive signal interconnection, the drive constant-potential interconnection, and the detection signal interconnection may protrude from the base, and the vibrator element may be supported by the tip parts.

An electronic apparatus according to an application example includes the vibrator device described above, and a signal processing circuit configured to perform signal processing based on an output signal of the vibrator device.

A vehicle according to an application example includes the vibrator device described above, and a signal processing circuit configured to perform signal processing based on an output signal of the vibrator device.

DESCRIPTION OF EXEMPLARY EMBODIMENTS

A vibrator device, an electronic apparatus, and a vehicle according to the present application example will hereinafter be described in detail based on some embodiments shown in the accompanying drawings.

First Embodiment

Figure 1:
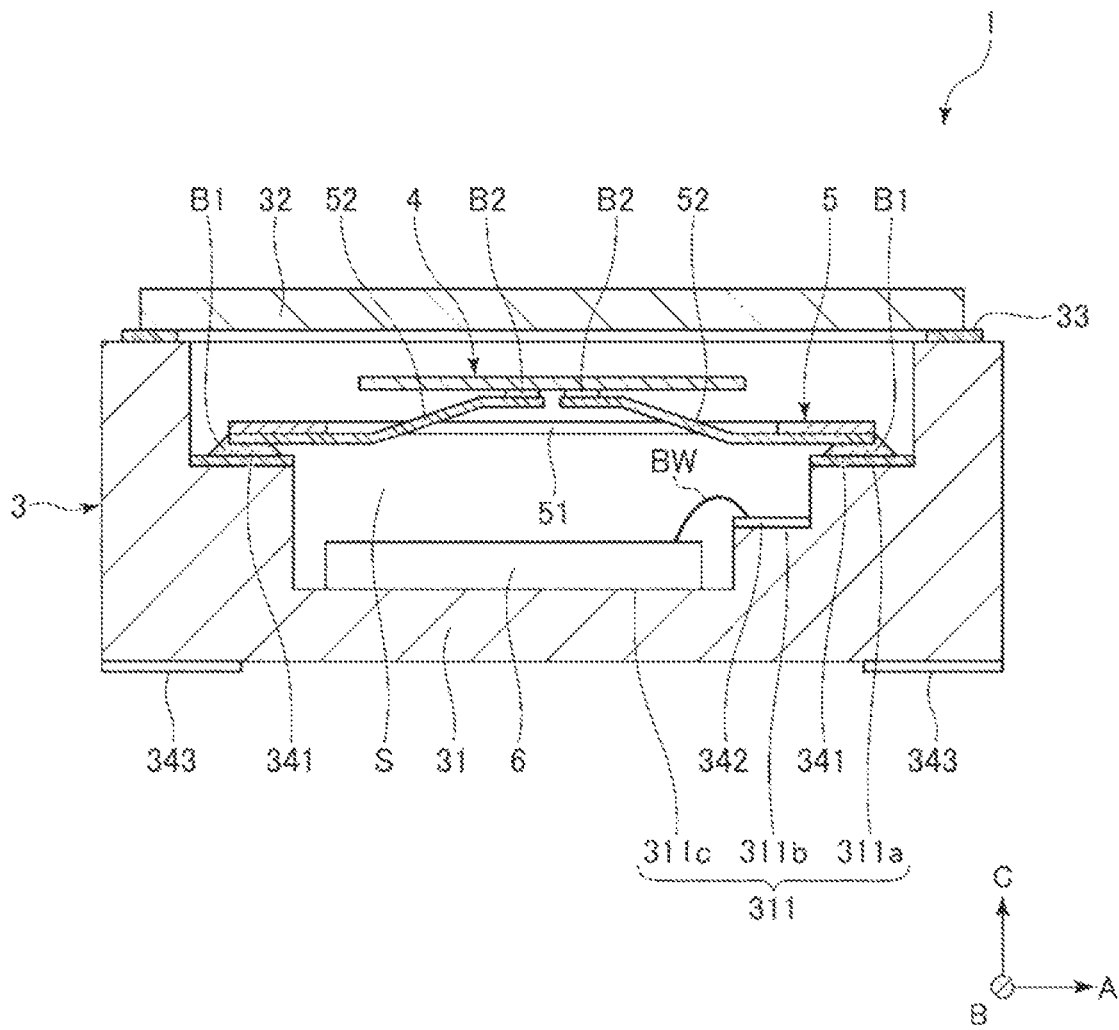
FIG. 1 is a cross-sectional view showing a vibrator device according to a first embodiment.
Figure 2:
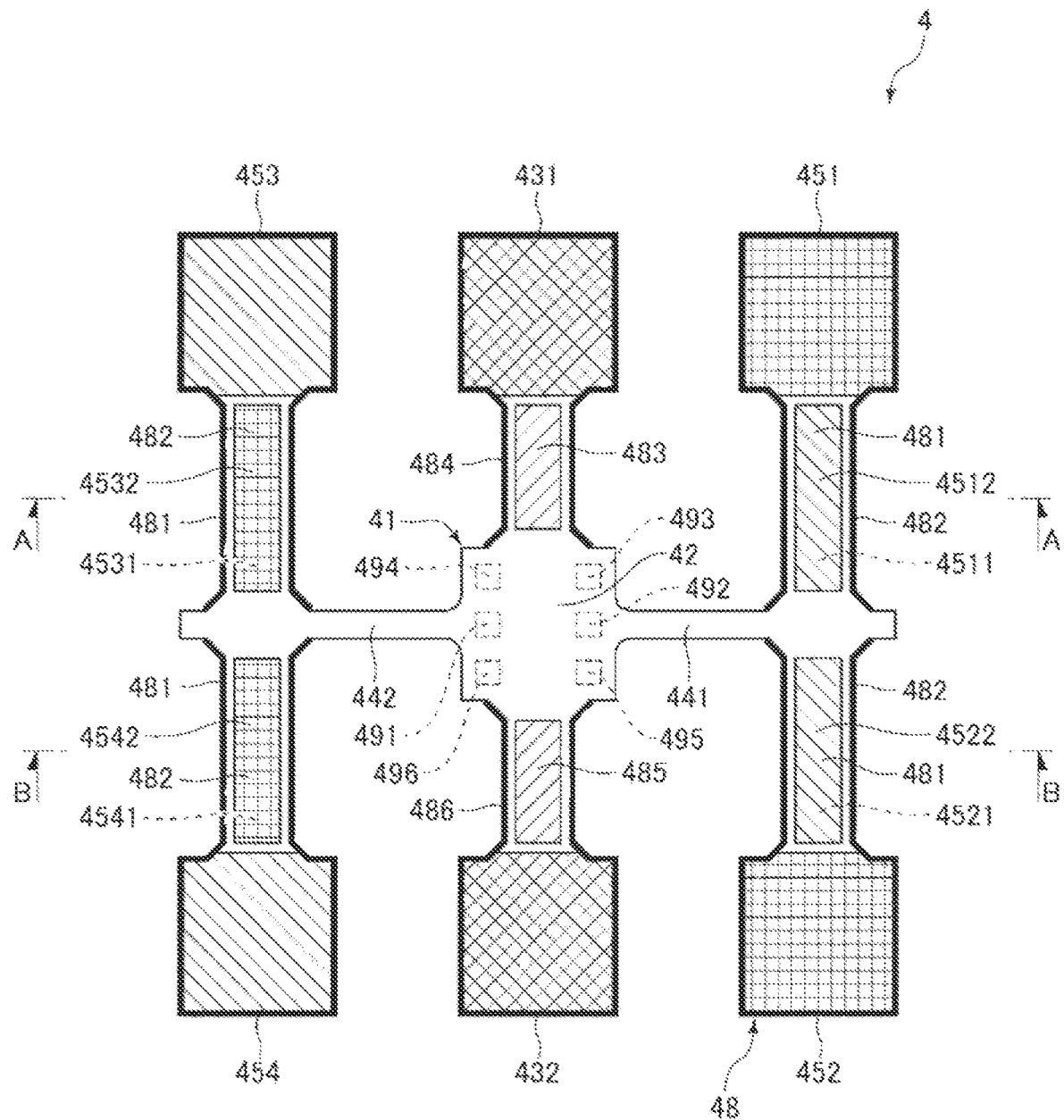
FIG. 2 is a plan view showing a vibrator element provided to the vibrator device shown in FIG. 1.
Figure 3:
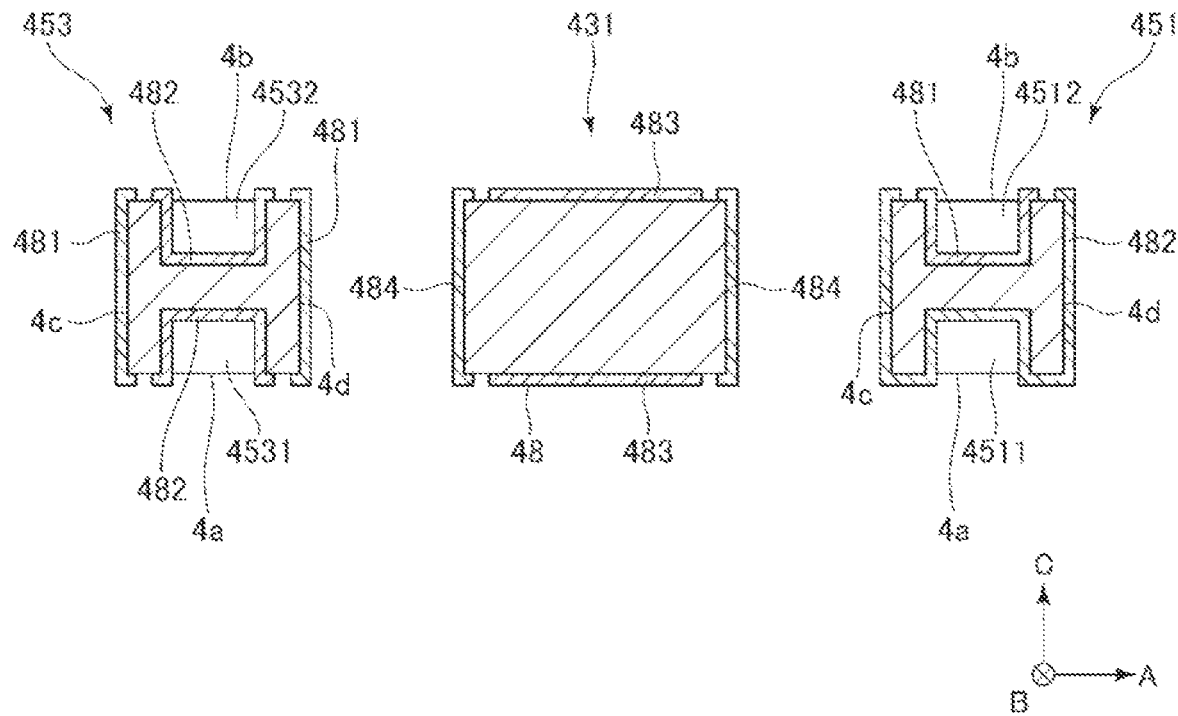
FIG. 3 is a cross-sectional view along the line A-A in FIG. 2.
Figure 4:
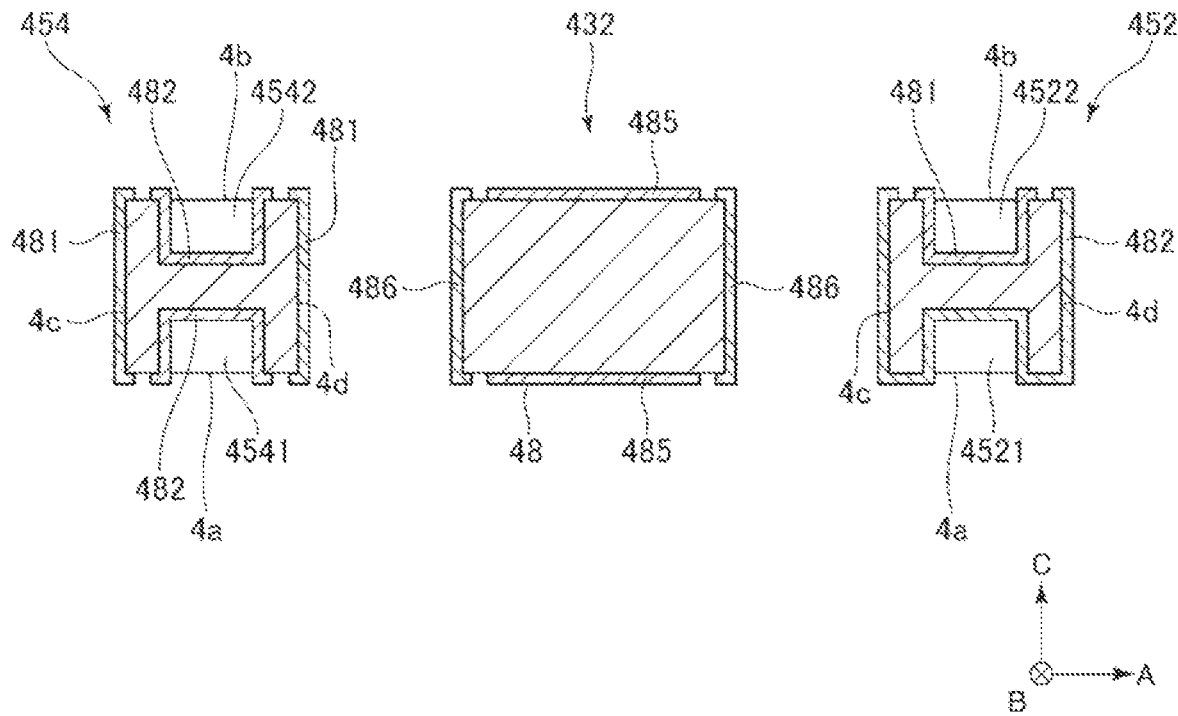
FIG. 4 is a cross-sectional view along the line B-B in FIG. 2.
Figure 5:
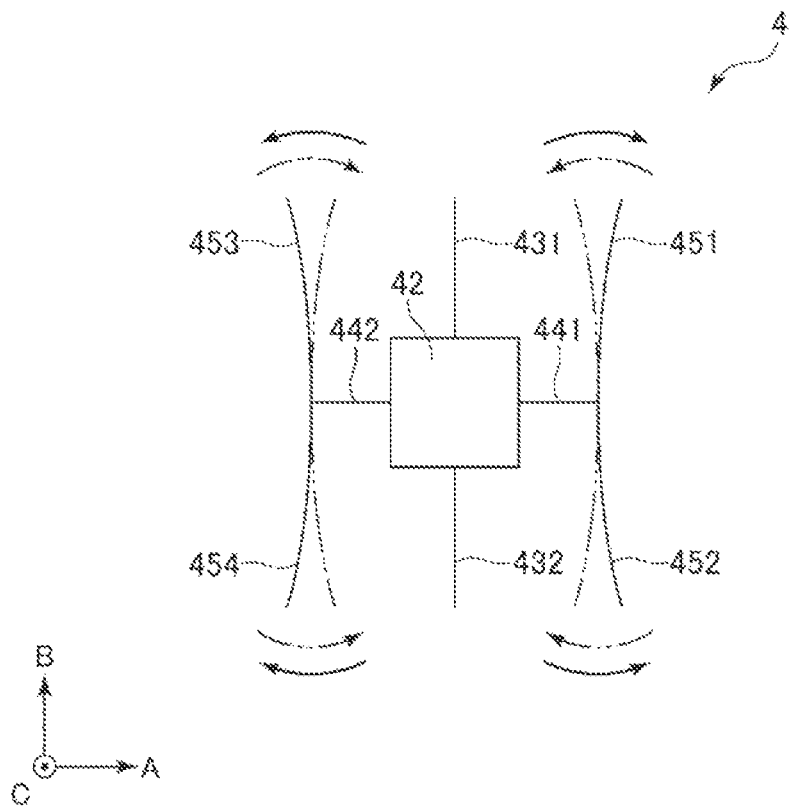
FIG. 5 is a schematic diagram for explaining drive of the vibrator element shown in FIG. 2.
Figure 6:
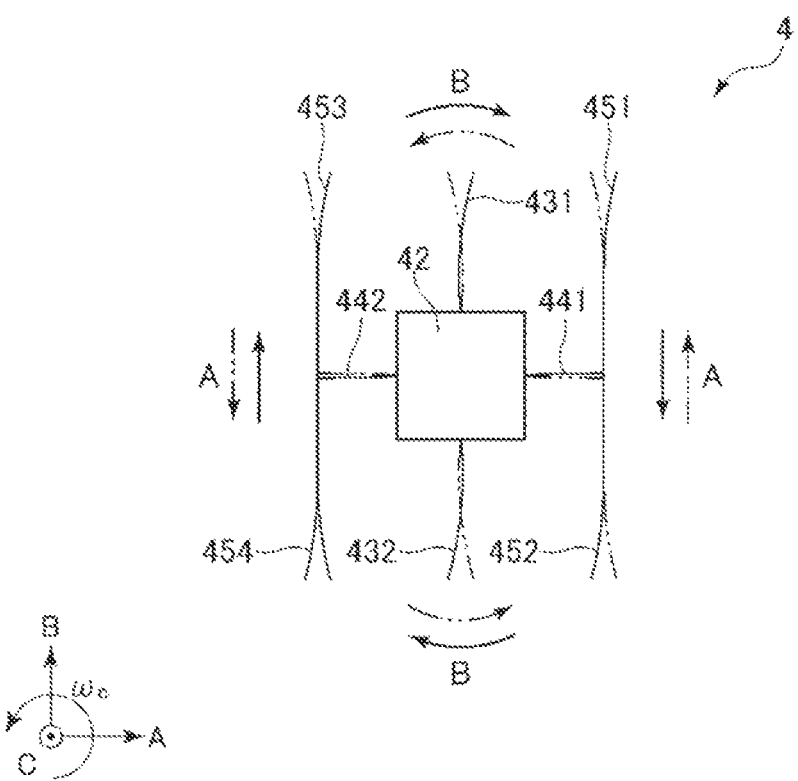
FIG. 6 is a schematic diagram for explaining drive of the vibrator element shown in FIG. 2.
Figure 7:
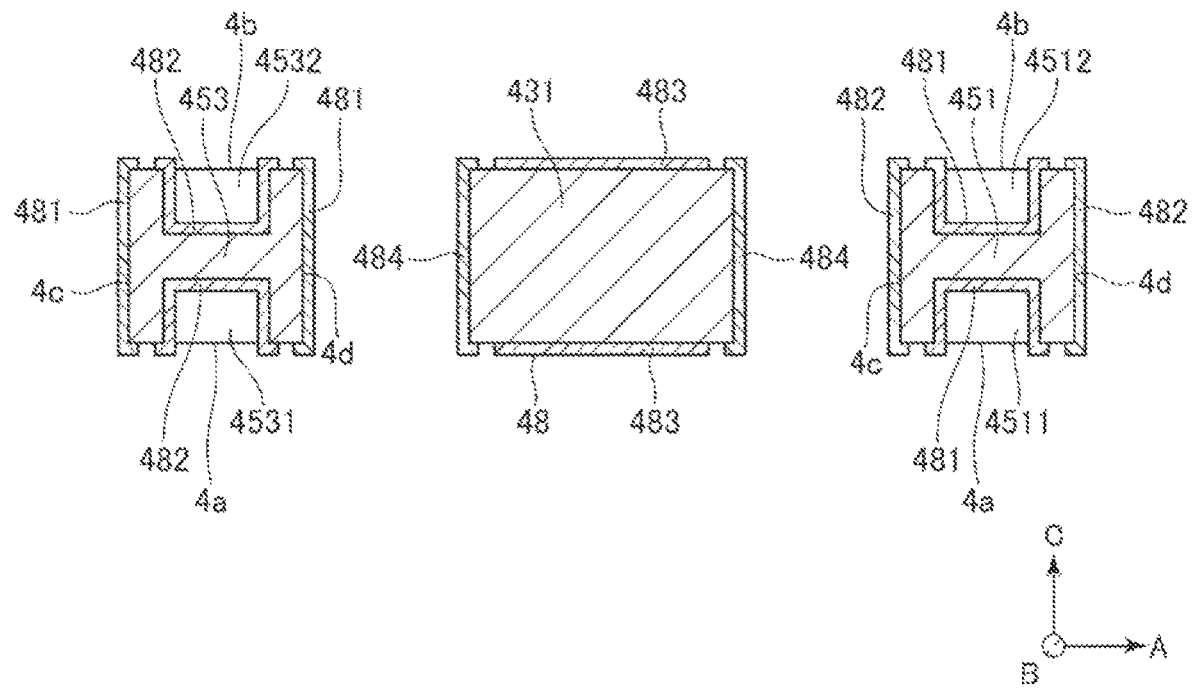
FIG. 7 is a cross-sectional view showing a related-art electrode arrangement of a vibrator element.
Figure 8:
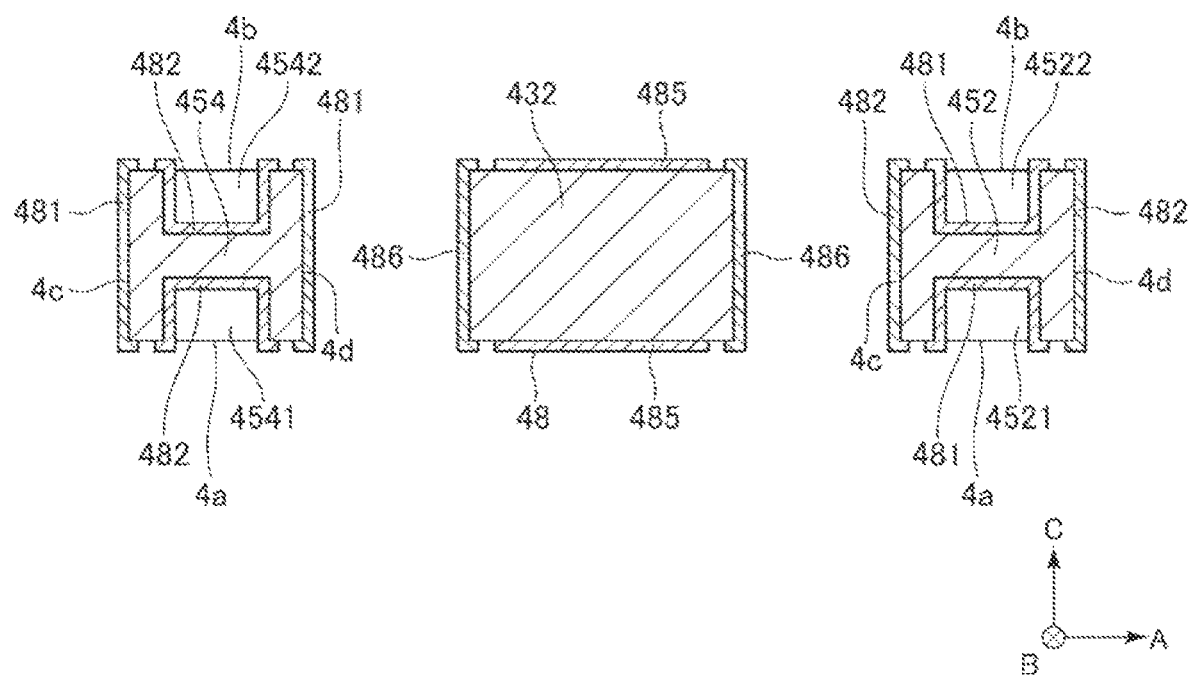
FIG. 8 is a cross-sectional view showing a related-art electrode arrangement of a vibrator element.
Figure 9:
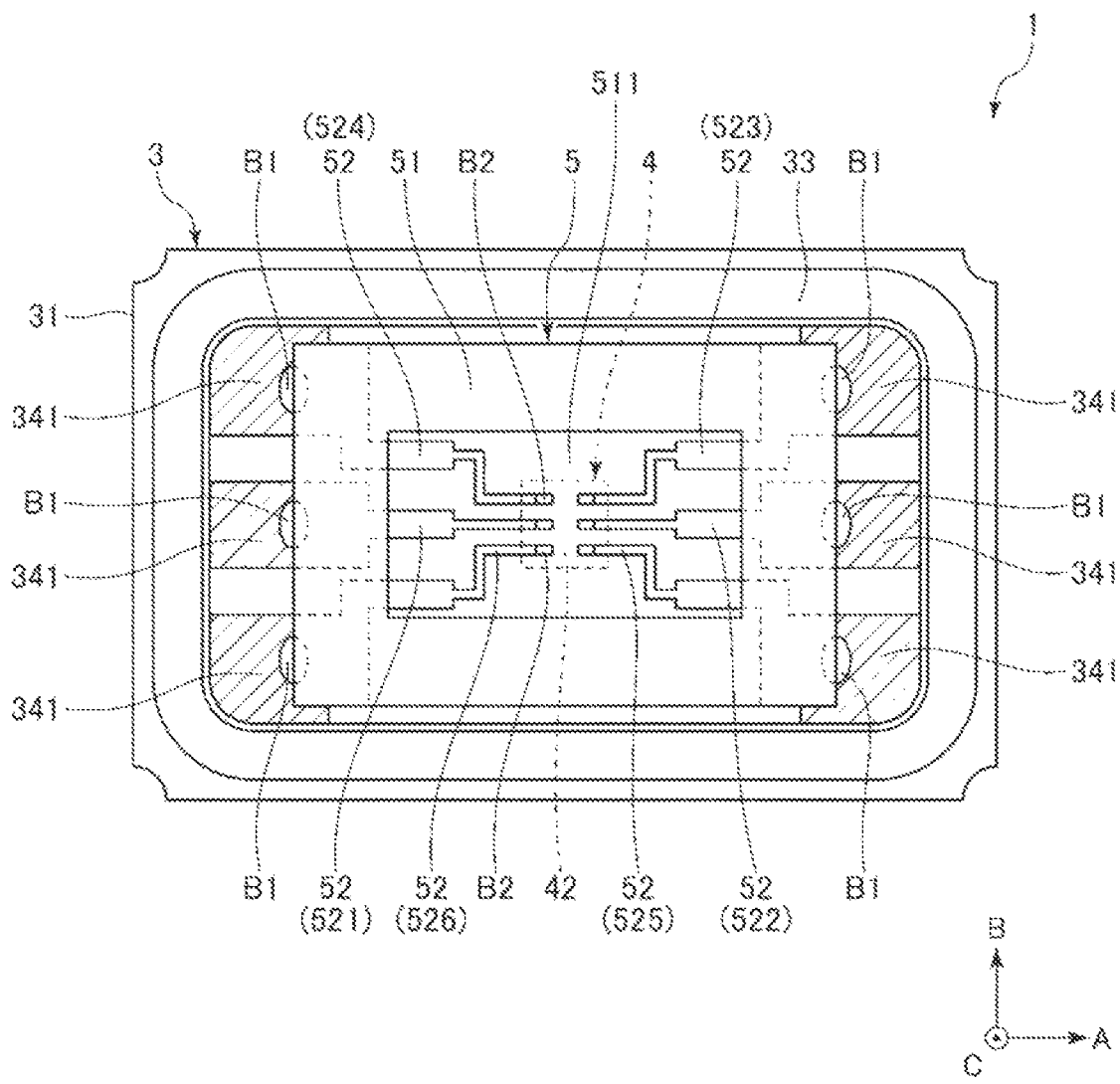
FIG. 9 is a plan view showing the vibrator device shown in FIG. 1.
Figure 10:
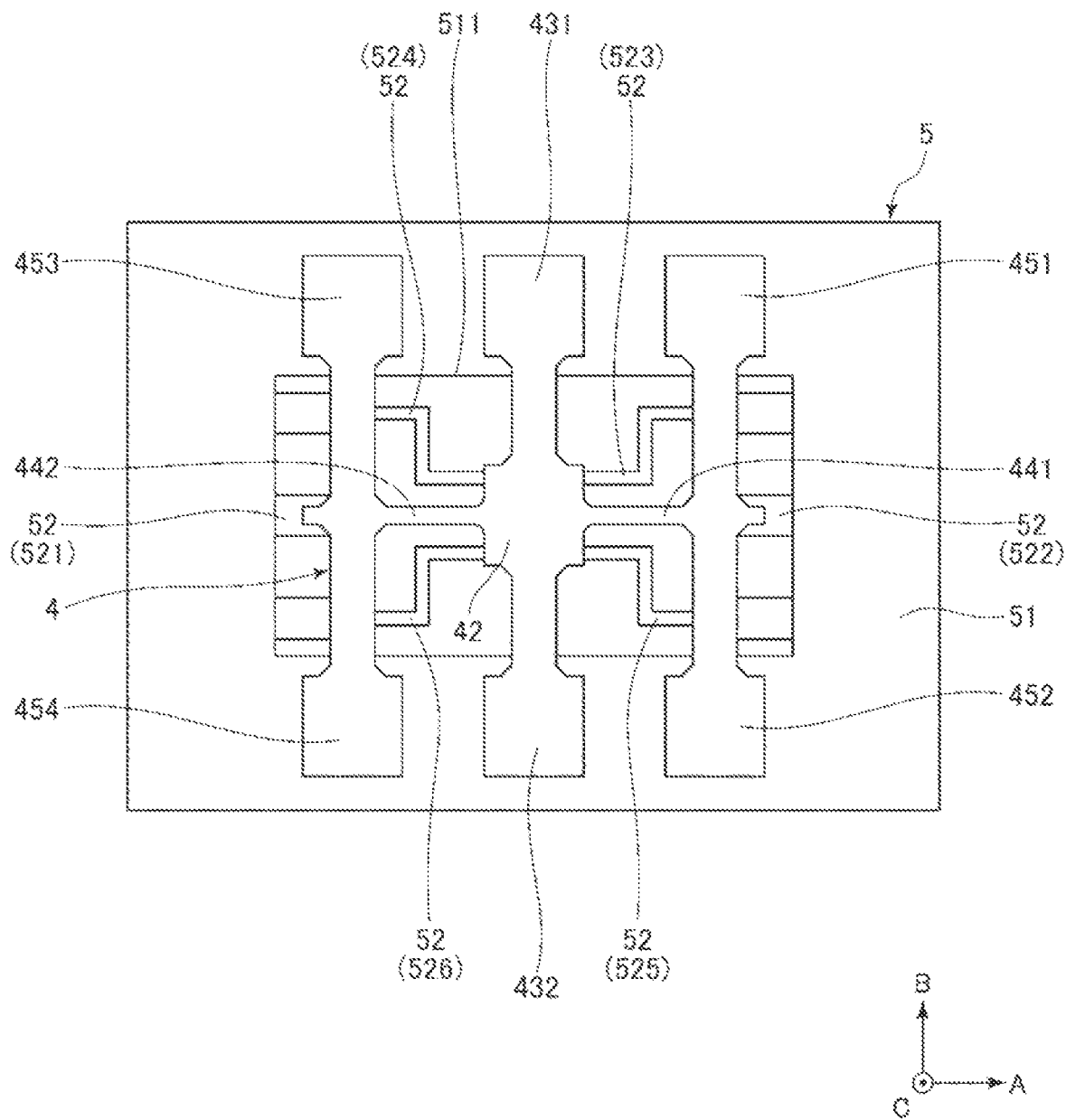
FIG. 10 is a plan view showing a support substrate provided to the vibrator device shown in FIG. 1.
Figure 11:
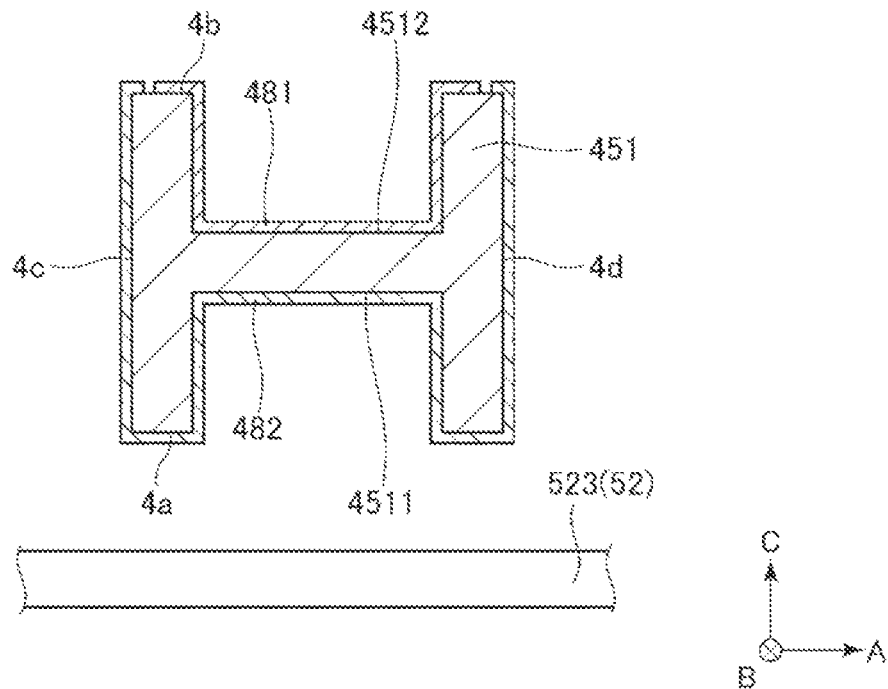
FIG. 11 is a cross-sectional view for explaining an advantage of the vibrator device.
Figure 12:
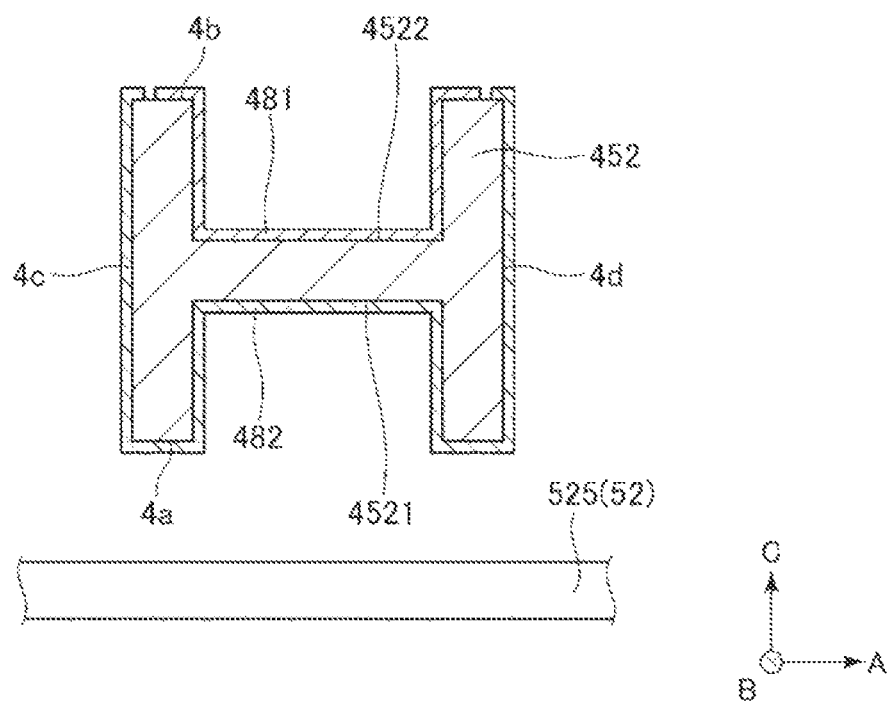
FIG. 12 is a cross-sectional view for explaining an advantage of the vibrator device.

FIG. 1 is a cross-sectional view showing a vibrator device according to a first embodiment. FIG. 2 is a plan view showing a vibrator element provided to the vibrator device shown in FIG. 1. FIG. 3 is a cross-sectional view along the line A-A in FIG. 2. FIG. 4 is a cross-sectional view along the line B-B in FIG. 2. FIG. 5 and FIG. 6 are each a schematic diagram for explaining drive of the vibrator element shown in FIG. 2. FIG. 7 and FIG. 8 are each a cross-sectional view showing a related-art electrode arrangement of the vibrator element. FIG. 9 is a plan view showing the vibrator device shown in FIG. 1. FIG. 10 is a plan view showing a support substrate provided to the vibrator device shown in FIG. 1. FIG. 11 and FIG. 12 are each a cross-sectional view for explaining an advantage of the vibrator device.

It should be noted that in FIG. 1 through FIG. 12, there are shown an A axis, a B axis, and a C axis as three axes perpendicular to each other for the sake of convenience of explanation. Further, hereinafter, the tip side of the arrow of each of the axes is also referred to as a "positive side," and the opposite side is also referred to as a "negative side." Further, the positive side of the C axis is also referred to as an "upper side," and the negative side is also referred to as a "lower side." Further, the plan view from a direction along the C axis is also referred to simply as a "plan view."

The vibrator device 1 shown in FIG. 1 is a physical quantity sensor, and is in particular a gyro sensor capable of detecting angular velocity ωc defining the C axis as the detection axis. Such a vibrator device 1 has a package 3, a vibrator element 4 housed in the package 3, a support substrate 5, and a circuit element 6.

The package 3 has a base 31 provided with a recess 311 opening in an upper surface, and a plate-shaped lid 32 which is bonded to an upper surface of the base 31 via a bonding member 33 so as to close the opening of the recess 311. The recess 311 forms an internal space S inside the package 3, and the vibrator element 4, the support substrate 5, and the circuit element 6 are housed in the internal space S. For example, the base 31 can be formed of ceramics such as alumina, and the lid 32 can be formed of a metal material such as kovar. It should be noted that the constituent material of each of the base 31 and the lid 32 is not particularly limited. For example, the lid 32 can be formed of a glass material having a light transmissive property.

Further, the internal space S is airtightly sealed, and is set in a reduced-pressure state, and is preferably a state approximate to a vacuum state. Thus, the vibration characteristics of the vibrator element 4 are improved. It should be noted that the atmosphere in the internal space S is not particularly limited, but can be an atmosphere filled with an inert gas such as nitrogen or Ar, or can be in the atmospheric pressure state or a pressurized state instead of the reduced-pressure state.

Further, the recess 311 has a recess 311a, a recess 311b, and a recess 311c wherein the recess 311a opens in the upper surface of the base 31, the recess 311b opens in a bottom surface of the recess 311a and is smaller in opening width than the recess 311a, and the recess 311c opens in a bottom surface of the recess 311b and is smaller in opening width than the recess 311b. Further, the support substrate 5 is bonded to the bottom surface of the recess 311a via bonding members B1 having electrical conductivity, the vibrator element 4 is bonded to the support substrate 5 via bonding members B2 having electrical conductivity, and the circuit element 6 is bonded to a bottom surface of the recess 311c.

By making the support substrate 5 intervene between the vibrator element 4 and the base 31, it becomes difficult for the stress caused by, for example, an impact or a heat deflection of the package 3 to reach the vibrator element 4, and it is possible to suppress degradation or a variation in vibration characteristics of the vibrator element 4.

Further, on the bottom surface of the recess 311a, there is disposed a plurality of internal terminals 341, on the bottom surface of the recess 311b, there is disposed a plurality of internal terminals 342, and on the lower surface of the base 31, there are disposed external terminals 343. Some of the internal terminals 342 are electrically coupled to the internal terminals 341 via internal interconnections not shown formed inside the base 31, and some of the rest of the internal terminals 342 are electrically coupled to external terminal 343 via the internal interconnections described above. Further, each of the internal terminals 342 is electrically coupled to the circuit element 6 via bonding wires BW.

The vibrator element 4 is a sensor element for detecting a physical quantity, and is in particular a gyro sensor element for detecting the angular velocity we defining the C axis as the detection axis in the present embodiment. As shown in FIG. 2 through FIG. 4, such a vibrator element 4 has a vibrating body 41 and electrodes 48 disposed on the vibrating body 41.

The vibrating body 41 is formed of a Z-cut quartz crystal plate, and has spread in an X-Y plane defined by an X axis as the electrical axis and a Y axis as the mechanical axis, the electrical axis and the mechanical axis being crystal axes of the quartz crystal, and has a thickness in a Z-axis direction as an optical axis. Further, the vibrating body 41 has a base part 42, detection arms 431, 432 extending toward both sides along the Y axis from the base part 42, coupling arms 441, 442 extending toward both sides along the X axis from the base part 42, drive arms 451, 452 extending toward both sides along the Y axis from a tip part of the coupling arm 441, and drive arms 453, 454 extending toward both sides along the Y axis from a tip part of the coupling arm 442.

The drive arms 451 through 454 each have a substantially rectangular lateral cross-sectional shape, and each have a lower surface 4a as a first surface, an upper surface 4b as a second surface located at an opposite side to the lower surface 4a, a side surface 4c as a third surface coupling the lower surface 4a and the upper surface 4b to each other on one side, and a side surface 4d as a fourth surface coupling the lower surface 4a and the upper surface 4b to each other on the other side. Further, the drive arms 451, 452, 453, and 454 respectively has recesses 4511, 4521, 4531, and 4541 opening in the lower surfaces 4a, and recesses 4512, 4522, 4532, and 4542 opening in the upper surfaces 4b.

It should be noted that the configuration of the drive arms 451, 452, 453, and 454 and the detection arms 431, 432 is not limited thereto, but, for example, wide parts disposed on the tip side can be eliminated, or the recesses 4511 through 4541, and 4512 through 4542 can also be eliminated.

Further, the electrodes 48 have a drive signal electrode 481, a drive ground electrode 482, a first detection signal electrode 483, a first detection ground electrode 484, a second detection signal electrode 485, and a second detection ground electrode 486. It should be noted that the drive ground electrode 482 is the ground for the drive signal electrode 481, the first detection ground electrode 484 is the ground for the first detection signal electrode 483, and the second detection ground electrode 486 is the ground for the second detection signal electrode 485.

The drive signal electrode 481 is disposed on the upper surfaces 4b of the drive arms 451, 452, and the both side surfaces 4c, 4d of the drive arms 453, 454. On the other hand, the drive ground electrode 482 is disposed on the lower surfaces 4a and both side surfaces 4c, 4d of the drive arms 451, 452, and the upper surface 4b and the lower surface 4a of the drive arms 453, 454. Further, the first detection signal electrode 483 is disposed on the upper surface and the lower surface of the detection arm 431, and the first detection ground electrode 484 is disposed on the both side surfaces of the detection arm 431. Meanwhile, the second detection signal electrode 485 is disposed on the upper surface and the lower surface of the detection arm 432, and the second detection ground electrode 486 is disposed on the both side surfaces of the detection arm 432.

Further, these electrodes 481 through 486 are each laid around to the lower surface of the base part 42. Therefore, on the lower surface of the base part 42, there are disposed terminal 491 through 496, wherein the terminal 491 is electrically coupled to the drive signal electrode 481, the terminal 492 is electrically coupled to the drive ground electrode 482, the terminal 493 is electrically coupled to the first detection signal electrode 483, the terminal 494 is electrically coupled to the first detection ground electrode 484, the terminal 495 is electrically coupled to the second detection signal electrode 485, and the terminal 496 is electrically coupled to the second detection ground electrode 486.

The vibrator element 4 having such a configuration is capable of detecting the angular velocity ωc defining the C axis as the detection axis in the following manner. Firstly, when applying a drive signal between the drive signal electrode 481 and the drive ground electrode 482, the drive arms 451 through 454 vibrate in such a drive vibration mode as shown in FIG. 5. When the angular velocity ωc is applied to the vibrator element 4 in the state of performing the drive in the drive vibration mode, the detection vibration mode shown in FIG. 6 is newly excited. In the detection vibration mode, a Coriolis force acts on the drive arms 451 through 454 to excite the vibration in a direction indicated by the arrow A, and in concert with this vibration, the detection vibration due to the flexural vibration occurs in a direction indicated by the arrow B in the detection arms 431, 432. The charge generated in the detection arms 431, 432 due to the detection vibration mode is extracted as the detection signal between the first and second detection signal electrodes 483, 485, and between the first and second detection ground electrodes 484, 486, and it is possible to detect the angular velocity ωc based on this signal.

It should be noted that, as a reference, in the related-art configuration, the arrangement of the drive signal electrode 481 and the drive ground electrode 482 is different, and as shown in FIG. 7 and FIG. 8, the drive signal electrode 481 is disposed on the upper surface 4b and the lower surface 4a of the drive arms 451, 452, and the both side surfaces 4c, 4d of the drive arms 453, 454, and the drive ground electrode 482 is disposed on the both side surfaces 4c, 4d of the drive arms 451, 452 and the upper surfaces 4b and the lower surfaces 4a of the drive arms 453, 454.

Going back to FIG. 1, the circuit element 6 is fixed to the bottom surface of the recess 311c. The circuit element 6 includes an interface section for communicating with, for example, an external host device, and a drive circuit and a detection circuit for driving the vibrator element 4 to detect the angular velocity ωc applied to the vibrator element 4.

Further, the support substrate 5 is a substrate used for TAB (Tape Automated Bonding) mounting. As shown in FIG. 9 and FIG. 10, the support substrate 5 has a frame-shaped base 51 and a plurality of leads 52 as interconnections provided to the base 51.

The base 51 is formed of a film made of insulating resin such as polyimide. It should be noted that the constituent material of the base 51 is not particularly limited, and the base 51 can be formed of, for example, insulating resin other than polyimide. Further, the base 51 is fixed to the bottom surface of the recess 311a with the bonding members B1, and further, the leads 52 and the internal terminals 341 are electrically coupled to each other via the bonding members B1. Further, the base part 42 of the vibrator element 4 is fixed to a tip part of each of the leads 52 with the bonding members B2, and further, the leads 52 and the terminals 491 through 496 are electrically coupled to each other via the bonding members B2, respectively. Thus, the vibrator element 4 is supported by the base 31 via the support substrate 5, and at the same time, electrically coupled to the circuit element 6.

The base 51 has a frame-like shape in a plan view from the direction along the C axis, and has an opening part 511 inside. The six leads 52 are bonding leads for supporting the vibrator element 4, and are wiring patterns constituted by electrically conductive members having electrical conductivity. In the present embodiment, as the electrically conductive members, there is used a metal material such as copper (Cu) or a copper alloy. The six leads 52 are each fixed to a lower surface of the base 51.

Further, three leads 522, 523, and 525 out of the six leads 52 are disposed in a part on a positive side in the A axis with respect to the center of the base 51, and the tip parts of the three leads extend to the inside of the opening part 511 of the base 51. Among these, the lead 522 is located at the center, the lead 523 is located at the positive side in the B-axis direction of the lead 522, and the lead 525 is located at the negative side in the B axis. Further, in the plan view from the direction along the C axis, the lead 523 overlaps the drive arm 451 in a crossing manner, and the lead 525 overlaps the drive arm 452 in a crossing manner.

Meanwhile, three leads 521, 524, and 526 as the rest of the leads are disposed in a part on a negative side in the A axis with respect to the center of the base 51, and the tip parts of the three leads extend to the inside of the opening part 511 of the base 51. Among these, the lead 521 is located at the center, the lead 524 is located at the positive side in the B axis of the lead 521, and the lead 526 is located at the negative side in the B axis. Further, in the plan view from the direction along the C axis, the lead 524 overlaps the drive arm 453 in a crossing manner, and the lead 526 overlaps the drive arm 454 in a crossing manner.

Further, the tip parts of the leads 522, 523, and 525 and the tip parts of the leads 521, 524, and 526 are respectively opposed to each other at the center of the opening part 511 at a distance.

Further, the lead 522 extends straight, and the leads 523, 525 located at both sides of the lead 522 bend at a right angle in the middle. Similarly, the lead 521 extends straight, and the leads 524, 526 located at both sides of the lead 521 bend at a right angle in the middle. Further, a base end part of each of the leads 52 is disposed on the lower surface of the base 51, and is electrically coupled to corresponding one of the internal terminals 341 via the bonding member B1.

Further, the leads 52 each bend in the middle to be tilted upward, and thus, the tip parts thereof are located above, namely on the positive side in the C axis of, the base 51. Further, the leads 52 each become narrow in width in the middle, and the tip parts thereof each become thinner than the base end side. Further, the base part 42 of the vibrator element 4 is fixed to the tip parts of the leads 52 via the bonding members B2. Further, the lead 521 is electrically coupled to the drive signal terminal 491 via the bonding member B2, the lead 522 is electrically coupled to the drive ground terminal 492 via the bonding member B2, the lead 523 is electrically coupled to the first detection signal terminal 493 via the bonding member B2, the lead 524 is electrically coupled to the first detection ground terminal 494 via the bonding member B2, the lead 525 is electrically coupled to the second detection signal terminal 495 via the bonding member B2, and the lead 526 is electrically coupled to the second detection ground terminal 496 via the bonding member B2.

It should be noted that the bonding members B1, B2 are not particularly limited providing both of electrical conductivity and a bonding property are provided, and it is possible to use, for example, a variety of metal bumps such as gold bumps, silver bumps, copper bumps, or solder bumps, or an electrically conductive adhesive having an electrically conductive filler such as a silver filler dispersed in a variety of adhesives such as a polyimide type adhesive, an epoxy type adhesive, a silicone type adhesive, or an acrylic adhesive. When using the metal bumps which are in the former group as the bonding members B1, B2, it is possible to suppress generation of a gas from the bonding members B1, B2, and it is possible to effectively prevent a change in environment, in particular rise in pressure, of the internal space S. On the other hand, when using the electrically conductive adhesive which is in the latter group as the bonding members B1, B2, the bonding members B1, B2 become relatively soft, and it is possible to absorb or relax the stress described above also in the bonding members B1, B2.

In the present embodiment, the electrically conductive adhesive is used as the bonding members B1, and the metal bumps are used as the bonding members B2. By using the electrically conductive adhesive as the bonding members B1 for bonding the support substrate 5 and the base 31 as materials different in type from each other, the thermal stress caused by a difference in thermal expansion coefficient therebetween can efficiently be absorbed or relaxed by the bonding members B1. On the other hand, since the support substrate 5 and the vibrator element 4 are bonded to each other with six bonding members B2 disposed in a relatively small area, by using the metal bumps as the bonding members B2, wetting spread which occurs in the case of the electrically conductive adhesive is prevented, and thus, it is possible to effectively prevent the bonding members B2 from having contact with each other.

The support substrate 5 is hereinabove described. In such a support substrate 5, the lead 523 which is electrically coupled to the first detection signal electrode 483 as described above, and propagates the detection signal output from the first detection signal electrode 483 overlaps the drive arm 451 in a crossing manner in the plan view from a direction along the C axis. Therefore, as shown in FIG. 11, the drive signal electrode 481 on the drive arm 451 and the lead 523 come close to each other to form the configuration in which the noise interference between the drive signal electrode 481 and the lead 523 is apt to occur. In other words, there is formed the configuration in which the drive signal applied to the drive signal electrode 481 is apt to mix in the detection signal as a noise via the lead 523.

Therefore, in the present embodiment, as described above, the drive ground electrode 482 coupled to the ground, namely a constant potential, is disposed on the lower surface 4a of the drive arm 451 on which the drive signal electrode 481 was disposed in the related art. Thus, the drive ground electrode 482 on the drive arm 451 can be disposed between the drive signal electrode 481 on the drive arm 451 and the lead 523. Therefore, the drive ground electrode 482 on the drive arm 451 functions as a shield layer, and it is possible to prevent the noise interference between the drive signal electrode 481 on the drive arm 451 and the lead 523.

Similarly, in the support substrate 5, the lead 525 which is electrically coupled to the second detection signal electrode 485 as described above, and propagates the detection signal output from the second detection signal electrode 485 overlaps the drive arm 452 in a crossing manner in the plan view from the direction along the C axis. Therefore, as shown in FIG. 12, the drive signal electrode 481 on the drive arm 452 and the lead 525 come close to each other to form the configuration in which the noise interference between the drive signal electrode 481 and the lead 525 is apt to occur. In other words, there is formed the configuration in which the drive signal applied to the drive signal electrode 481 is apt to mix in the detection signal as a noise via the lead 525.

Therefore, in the present embodiment, as described above, the drive ground electrode 482 coupled to the ground, namely a constant potential, is disposed on the lower surface 4a of the drive arm 452 on which the drive signal electrode 481 was disposed in the related art. Thus, the drive ground electrode 482 on the drive arm 452 can be disposed between the drive signal electrode 481 on the drive arm 452 and the lead 525. Therefore, the drive ground electrode 482 on the drive arm 452 functions as a shield layer, and it is possible to prevent the noise interference between the drive signal electrode 481 on the drive arm 452 and the lead 525.

Due to the above, it is possible to effectively prevent the drive signal applied to the drive signal electrode 481 from mixing in the detection signal as a noise via the leads 523, 525. Therefore, it is possible to transmit the highly accurate detection signal high in S/N ratio to the circuit element 6, and thus, it is possible to detect the angular velocity ωc with higher accuracy.

In particular, in the drive arms 451, 452, the drive ground electrode 482 is disposed not only on the lower surface 4a, but also on the both side surfaces 4c, 4d. In other words, the drive ground electrode 482 is disposed so as to surround the both sides of the drive signal electrode 481 disposed on the upper surface 4b. Therefore, the shield effect described above of the drive ground electrode 482 is further enhanced, and it is possible to more effectively suppress the noise interference between the drive signal electrode 481 on the drive arms 451, 452 and the leads 523, 525.

Further, the lower surfaces 4a of the drive arms 451, 452 have the recesses 4511, 4521 recessed toward the upper surface 4b side, and the drive ground electrode 482 is disposed on inner surfaces of the recesses 4511, 4521. Therefore, the surface area of the drive ground electrode 482 increases, and the shield effect is further enhanced accordingly. As a result, it is possible to more effectively suppress the noise interference between the drive signal electrode 481 on the drive arms 451, 452 and the leads 523, 525.

The vibrator device 1 is hereinabove described. As described above, such a vibrator device 1 has the vibrator element 4 and the support substrate 5 supporting the vibrator element 4. Further, the vibrator element 4 has the drive arms 451, 452, 453, and 454 and the detection arms 431, 432 wherein the drive arms 451, 452, 453, and 454 are provided with the drive signal electrode 481 and the drive ground electrode 482 as the drive constant-potential electrode, and perform the drive vibration in response to application of the drive signal to the drive signal electrode 481, and the detection arms 431, 432 which have the first and second detection signal electrodes 483, 485 as the detection signal electrodes and the first and second detection ground electrodes 484, 486 as the detection constant-potential electrodes, and perform the detection vibration in response to the angular velocity ωc as the physical quantity of the detection target to thereby output the detection signal from the first and second detection signal electrodes 483, 485.

Further, the support substrate 5 has the base 51, and the leads 521, 522, 523, and 525 provided to the base 51 wherein the lead 521 is a drive signal interconnection electrically coupled to the drive signal electrode 481, the lead 522 is a drive constant-potential interconnection electrically coupled to the drive ground electrode 482, the lead 523 is a first detection signal interconnection electrically coupled to the first detection signal electrode 483, and the lead 525 is a second detection signal interconnection electrically coupled to the second detection signal electrode 485. Further, the drive arms 451, 452 each have the lower surface 4a as a first surface located at the support substrate 5 side, and the upper surface 4b as a second surface located at an opposite side to the lower surface 4a wherein the drive ground electrode 482 is disposed on the lower surface 4a and the drive signal electrode 481 is disposed on the upper surface 4b.

According to such a configuration, the drive ground electrode 482 on the drive arm 451 can be disposed between the drive signal electrode 481 on the drive arm 451 and the lead 523. Similarly, the drive ground electrode 482 on the drive arm 452 can be disposed between the drive signal electrode 481 on the drive arm 452 and the lead 525. Therefore, the drive ground electrode 482 on the drive arms 451, 452 functions as the shield layer, and it is possible to prevent the noise interference between the drive signal electrode 481 on the drive arms 451, 452 and the leads 523, 525, respectively. Therefore, it is possible to effectively prevent the drive signal applied to the drive signal electrode 481 from mixing in the detection signal as a noise via the leads 523, 525, and thus it is possible to transmit the detection signal which is high in S/N ratio, and is therefore high in accuracy to the circuit element 6. Therefore, there is achieved the vibrator device 1 capable of detecting the angular velocity we with higher accuracy.

Further, as described above, the drive arms 451, 452 each have the side surfaces 4c, 4d which are third and fourth surfaces as the pair of surfaces for connecting the upper surface 4b and the lower surface 4a to each other. Further, the drive ground electrode 482 is disposed on the lower surface 4a and the both side surfaces 4c, 4d. In other words, the drive ground electrode 482 is disposed so as to surround the both sides of the drive signal electrode 481 disposed on the upper surface 4b. Therefore, the shield effect described above of the drive ground electrode 482 is further enhanced, and it is possible to more effectively suppress the noise interference between the drive signal electrode 481 on the drive arms 451, 452 and the leads 523, 525.

Further, as described above, the lower surfaces 4a have the recesses 4511, 4521 recessed toward the upper surface 4b side, and the drive ground electrode 482 is provided to the recesses 4511, 4521. Thus, it is possible to increase the surface area of the drive ground electrode 82 compared to when, for example, the lower surface 4a is a planar surface, and accordingly, the shield effect by the drive ground electrode 482 is further enhanced. As a result, it is possible to more effectively suppress the noise interference between the drive signal electrode 481 on the drive arms 451, 452 and the leads 523, 525.

Further, as described above, the lead 523 has a portion opposed to the drive arm 451, and the lead 525 has a portion opposed to the drive arm 452. In other words, in the plan view from the direction along the C axis, the lead 523 has the portion overlapping the drive arm 451, and the lead 525 has the portion overlapping the drive arm 452. Therefore, the drive signal electrode 481 on the drive arms 451, 452 is apt to be closer to the leads 523, 525, respectively, and thus the noise interference described above is apt to occur therebetween. In such a positional relationship, by disposing the detection ground interconnection 482 functioning as the shield layer on the lower surfaces 4a of the drive arms 451, 452, namely between the drive signal electrode 481 and the leads 523, 525, it is possible to more remarkably exert the noise interference suppressing effect described above.

Further, as described above, the tip parts of the leads 521 through 526 protrude from the base 51, and the vibrator element 4 is supported by the tip pars of these leads 521 through 526. Thus, it is possible to support the vibrator element 4 with the support substrate 5, and at the same time, it becomes easy to electrically couple the vibrator element 4 and the support substrate 5. Further, by the leads 521 through 526 deforming, it is possible to absorb or relax the stress which reaches from the package 3. Therefore, it becomes difficult for the stress to reach the vibrator element 4, and it is possible to exert the excellent detection characteristics.

Second Embodiment

Figure 13:
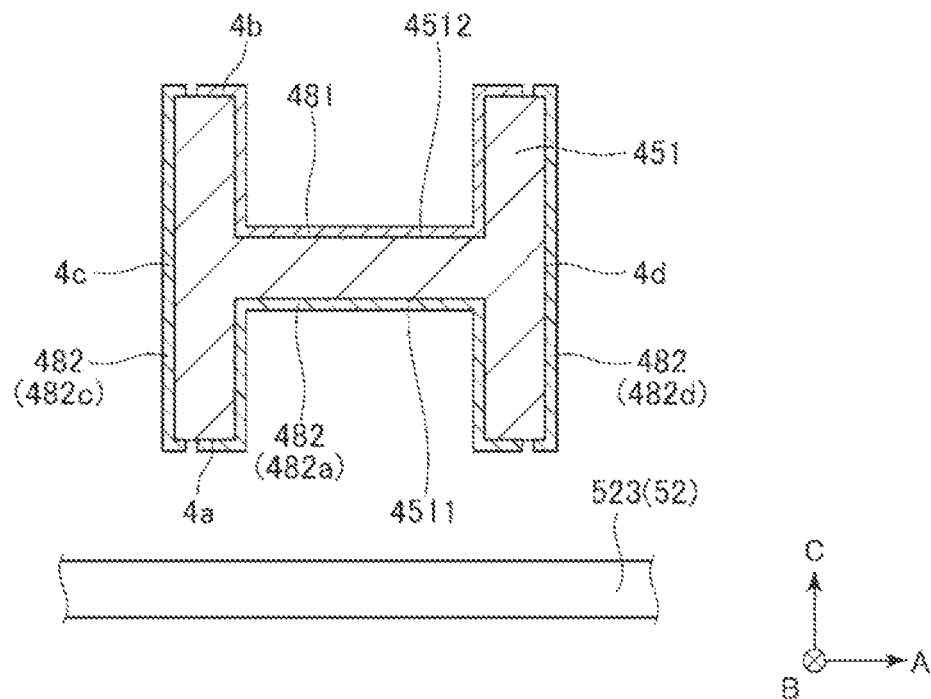
FIG. 13 is a cross-sectional view of a drive arm provided to a vibrator element in a second embodiment.
Figure 14:
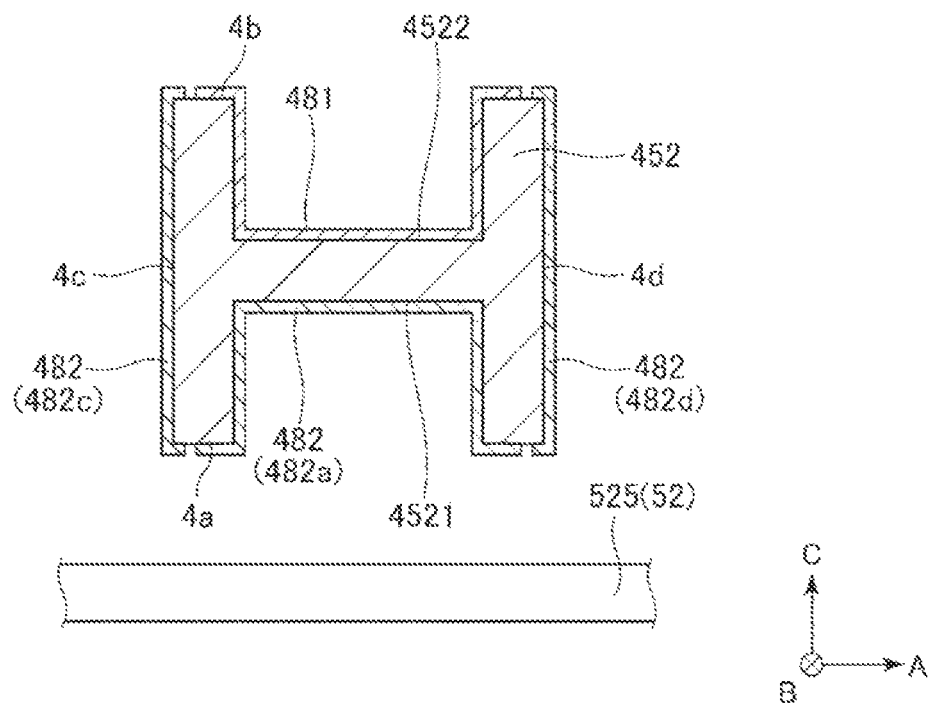
FIG. 14 is a cross-sectional view of the drive arm provided to the vibrator element in the second embodiment.

FIG. 13 and FIG. 14 are each a cross-sectional view of a drive arm provided to a vibrator element in a second embodiment.

The present embodiment is substantially the same as the first embodiment described above except the point that the configuration of the drive arms 451, 452 is different. It should be noted that in the following description, the present embodiment will be described with a focus on the difference from the first embodiment described above, and the description of substantially the same issues will be omitted. Further, in FIG. 13 and FIG. 14, the constituents substantially the same as those of the embodiment described above are denoted by the same reference symbols.

As shown in FIG. 13 and FIG. 14, in the vibrator element 4 in the present embodiment, the drive ground electrode 482 disposed on the drive arm 451 is divided into a portion 482*a* disposed on the lower surface 4*a*, a portion 482*c* disposed on the side surface 4*c*, and a portion 482*d* disposed on the side surface 4*d*. Similarly, the drive ground electrode 482 disposed on the drive arm 452 is divided into a portion 482*a* disposed on the lower surface 4*a*, a portion 482*c* disposed on the side surface 4*c*, and a portion 482*d* disposed on the side surface 4*d*.

Therefore, when viewing only the arrangement of the electrodes regardless of the types of the electrodes, the arrangement becomes symmetric between the drive arms 451, 452 and the drive arms 453, 454, and is further substantially the same as the related-art configuration shown in FIG. 7 and FIG. 8. Therefore, the mass balance of the vibrator element 4 becomes more excellent compared to, for example, the first embodiment described above. Further, since there is no need to change the electrode arrangement from that in the related-art configuration, it is possible to use the manufacturing method for the related-art configuration, in particular, the mask used when pattering the electrodes without modification. Therefore, it becomes easy to manufacture the vibrator element 4.

According also to such a second embodiment as described above, substantially the same advantages as in the first embodiment described above can be exerted.

Third Embodiment

Figure 15:
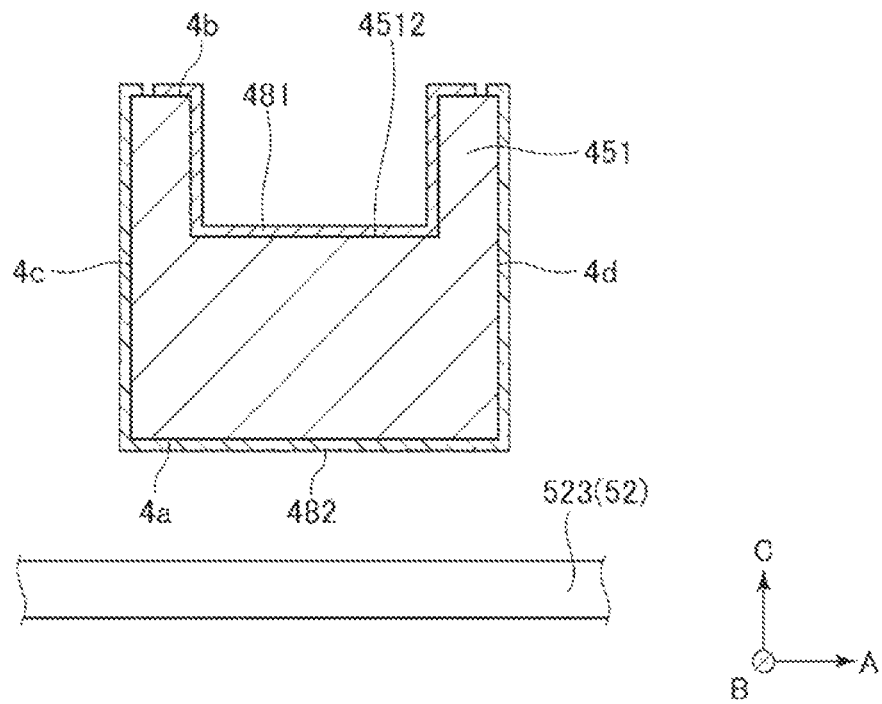
FIG. 15 is a cross-sectional view of the drive arm provided to the vibrator element in a third embodiment.
Figure 16:
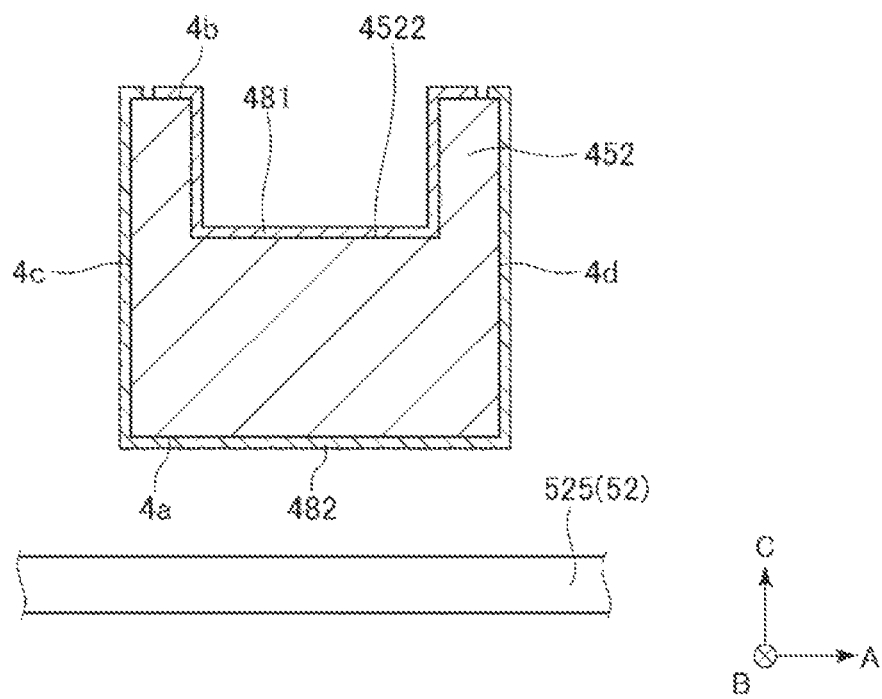
FIG. 16 is a cross-sectional view of the drive arm provided to the vibrator element in the third embodiment.

FIG. 15 and FIG. 16 are each a cross-sectional view of a drive arm provided to a vibrator element in a third embodiment.

The present embodiment is substantially the same as the first embodiment described above except the point that the configuration of the drive arms 451, 452 is different. It should be noted that in the following description, the present embodiment will be described with a focus on the difference from the first embodiment described above, and the description of substantially the same issues will be omitted. Further, in FIG. 15 and FIG. 16, the constituents substantially the same as those of the embodiment described above are denoted by the same reference symbols.

As shown in FIG. 15 and FIG. 16, in the vibrator element 4 in the present embodiment, the recess 4511 is eliminated from the lower surface 4*a* of the drive arm 451, and thus, the lower surface 4*a* is made as a planar surface. Further, on the planar surface, there is disposed the drive ground electrode 482. Similarly, the recess 4521 is eliminated from the lower surface 4*a* of the drive arm 452, and thus, the lower surface 4*a* is made as a planar surface. Further, on the planar surface, there is disposed the drive ground electrode 482.

According to such a configuration, since the lower surfaces 4*a* of the drive arms 451, 452 are made as the planar surfaces, it becomes easy to form the drive ground electrode 482 on the lower surfaces 4*a*. Further, by eliminating, for example, the recesses 4511, 4521, it is possible to prevent the problem in the drive ground electrode 482 such as broken lines of the drive ground electrode 482 in corner portions of the recesses 4511, 4521.

According also to such a third embodiment as described above, substantially the same advantages as in the first embodiment described above can be exerted. It should be noted that it is also possible to make the recess 4512 disposed on the upper surface 4*b* deeper than in the illustrated configuration, and thus, the electric field efficiency is enhanced.

Fourth Embodiment

Figure 17:
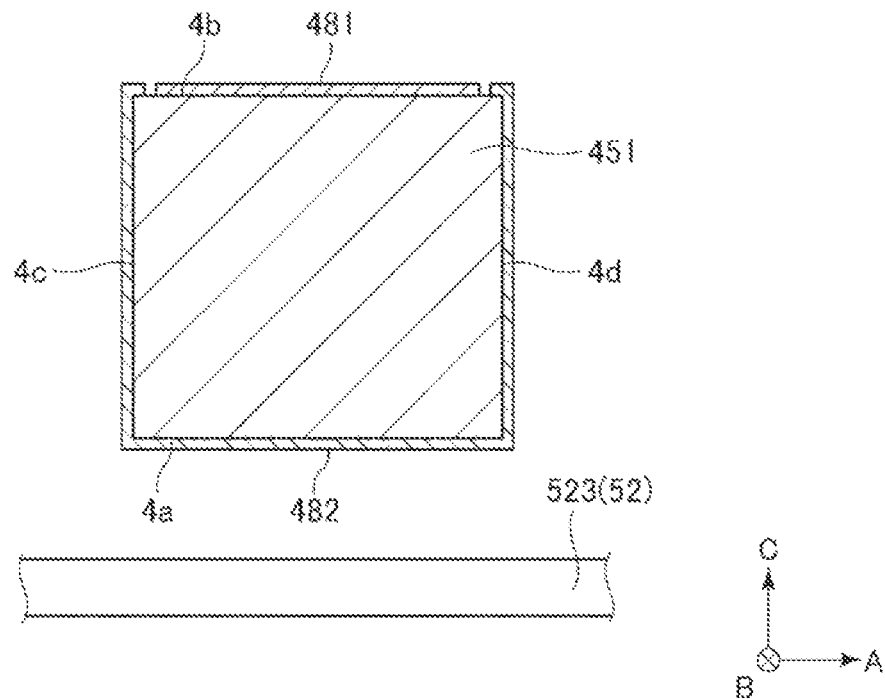
FIG. 17 is a cross-sectional view of a drive arm provided to a vibrator element in a fourth embodiment.
Figure 18:
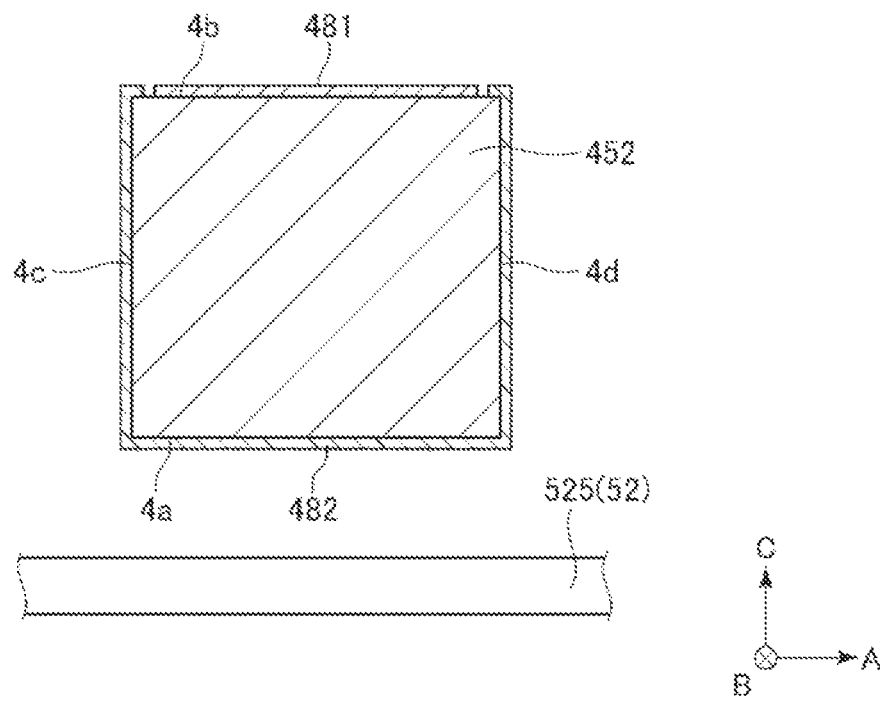
FIG. 18 is a cross-sectional view of the drive arm provided to the vibrator element in the fourth embodiment.

FIG. 17 and FIG. 18 are each a cross-sectional view of a drive arm provided to a vibrator element in a fourth embodiment.

The present embodiment is substantially the same as the third embodiment described above except the point that the configuration of the drive arms 451, 452 is different. It should be noted that in the following description, the present embodiment will be described with a focus on the difference from the third embodiment described above, and the description of substantially the same issues will be omitted. Further, in FIG. 17 and FIG. 18, the constituents substantially the same as those of the embodiment described above are denoted by the same reference symbols.

As shown in FIG. 17 and FIG. 18, in the vibrator element 4 in the present embodiment, the recess 4512 is eliminated from the upper surface 4*b* of the drive arm 451, and thus, the upper surface 4*b* is made as a planar surface. Further, on the planar surface, there is disposed the drive signal electrode 481. Similarly, the recess 4522 is eliminated from the upper surface 4*b* of the drive arm 452, and thus, the upper surface 4*b* is made as a planar surface. Further, on the planar surface, there is disposed the drive signal electrode 481.

According to such a configuration, since the upper surfaces 4*b* of the drive arms 451, 452 are made as the planar surfaces, it becomes easy to form the drive signal electrode 481 on the upper surfaces 4*b*. Further, by eliminating, for example, the recesses 4512, 4522, it is possible to prevent the problem in the drive signal electrode 481 such as broken lines of the drive signal electrode 481 in corner portions of the recesses 4512, 4522. Further, since the shape of each of the drive arms 451, 452 is made vertically symmetric, it is possible to effectively prevent unwanted vibration in a direction along the C axis from occurring in the drive arms 451, 452 in the drive vibration mode.

According also to such a fourth embodiment as described above, substantially the same advantages as in the first embodiment described above can be exerted.

Fifth Embodiment

Figure 19:
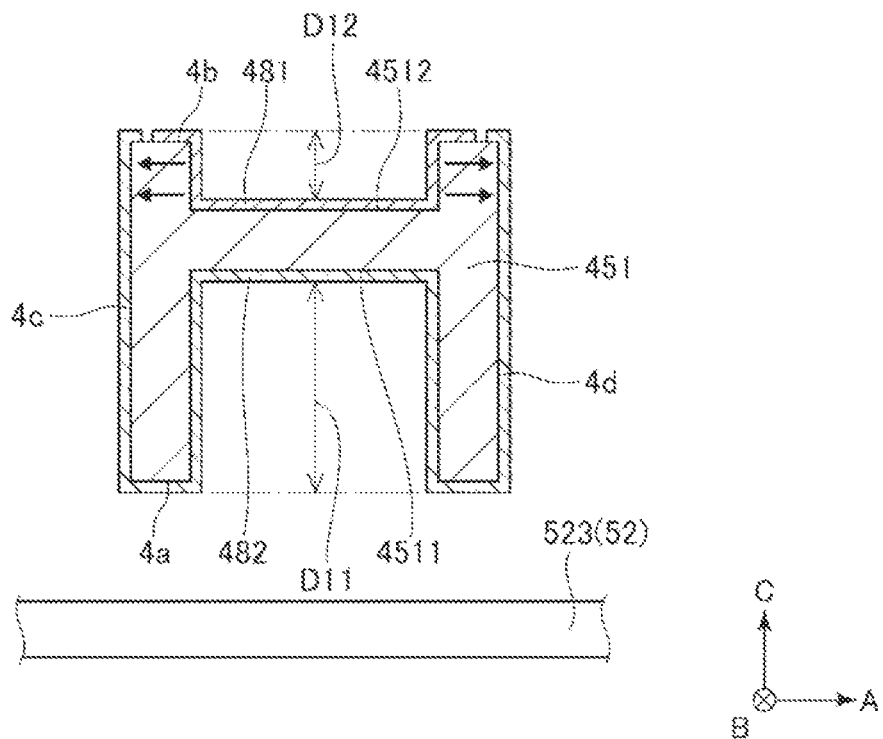
FIG. 19 is a cross-sectional view of a drive arm provided to a vibrator element in a fifth embodiment.
Figure 20:
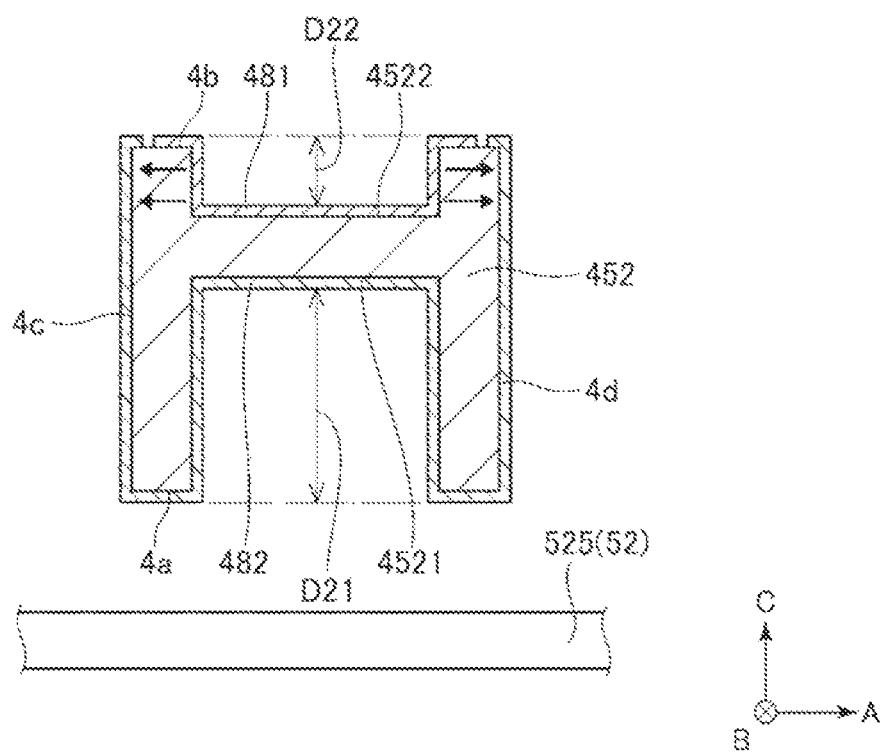
FIG. 20 is a cross-sectional view of the drive arm provided to the vibrator element in the fifth embodiment.

FIG. 19 and FIG. 20 are each a cross-sectional view of a drive arm provided to a vibrator element in a fifth embodiment.

The present embodiment is substantially the same as the first embodiment described above except the point that the configuration of the drive arms 451, 452 is different. It should be noted that in the following description, the present embodiment will be described with a focus on the difference from the first embodiment described above, and the description of substantially the same issues will be omitted. Further, in FIG. 19 and FIG. 20, the constituents substantially the same as those of the embodiment described above are denoted by the same reference symbols.

As shown in FIG. 19 and FIG. 20, in the drive arm 451, the depth D11 of the recess 4511 disposed on the lower surface 4a is deeper than the depth D12 of the recess 4512 disposed on the upper surface 4b. In other words, D11>D12 is true. Similarly, in the drive arm 452, the depth D21 of the recess 4521 disposed on the lower surface 4a is deeper than the depth D22 of the recess 4522 disposed on the upper surface 4b. In other words, D21>D22 is true.

As indicated by the arrows in FIG. 19 and FIG. 20, the electric field formed between the drive signal electrode 481 and the drive ground electrode 482 is mainly generated intensively in an upper side portion of the drive arm 451. Therefore, the upper side portion of the drive arm 451 makes the flexural vibration with larger amplitude than in a lower side portion, and this causes a possibility that the unwanted vibration in the C-axis direction occurs in the drive arm 451. Therefore, by making the recess 4511 deeper than the recess 4512 to make the rigidity of the lower side portion of the drive arm 451 lower than the rigidity of the upper side portion, the flexural vibration of the upper side portion of the drive arm 451 decreases, and thus, it is possible to adjust the vibration balance. As a result, it is possible to suppress the unwanted vibration in the direction along the C axis.

According also to such a fifth embodiment as described above, substantially the same advantages as in the first embodiment described above can be exerted.

Sixth Embodiment

Figure 21:
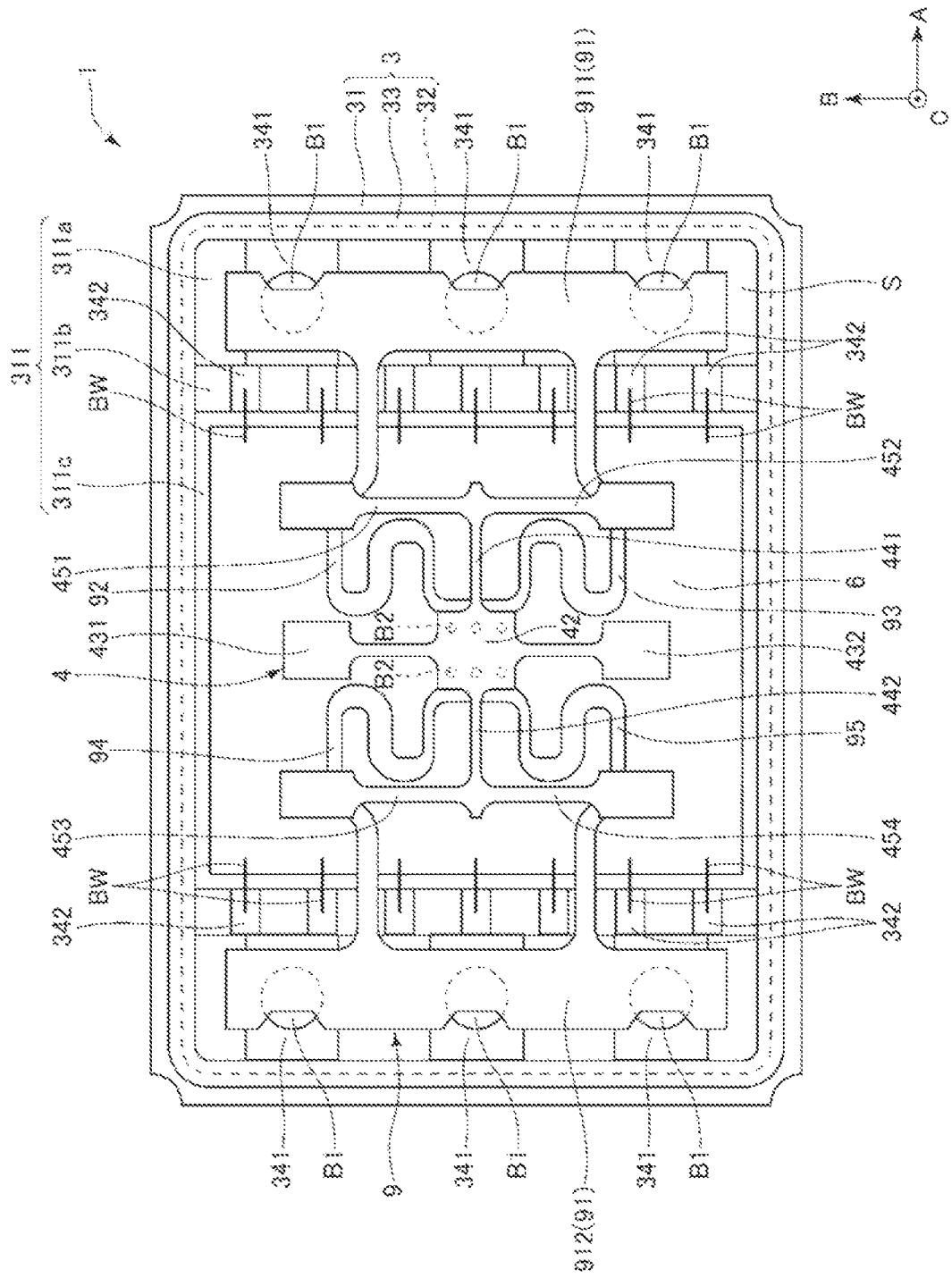
FIG. 21 is a plan view showing a vibrator device according to a sixth embodiment.
Figure 22:
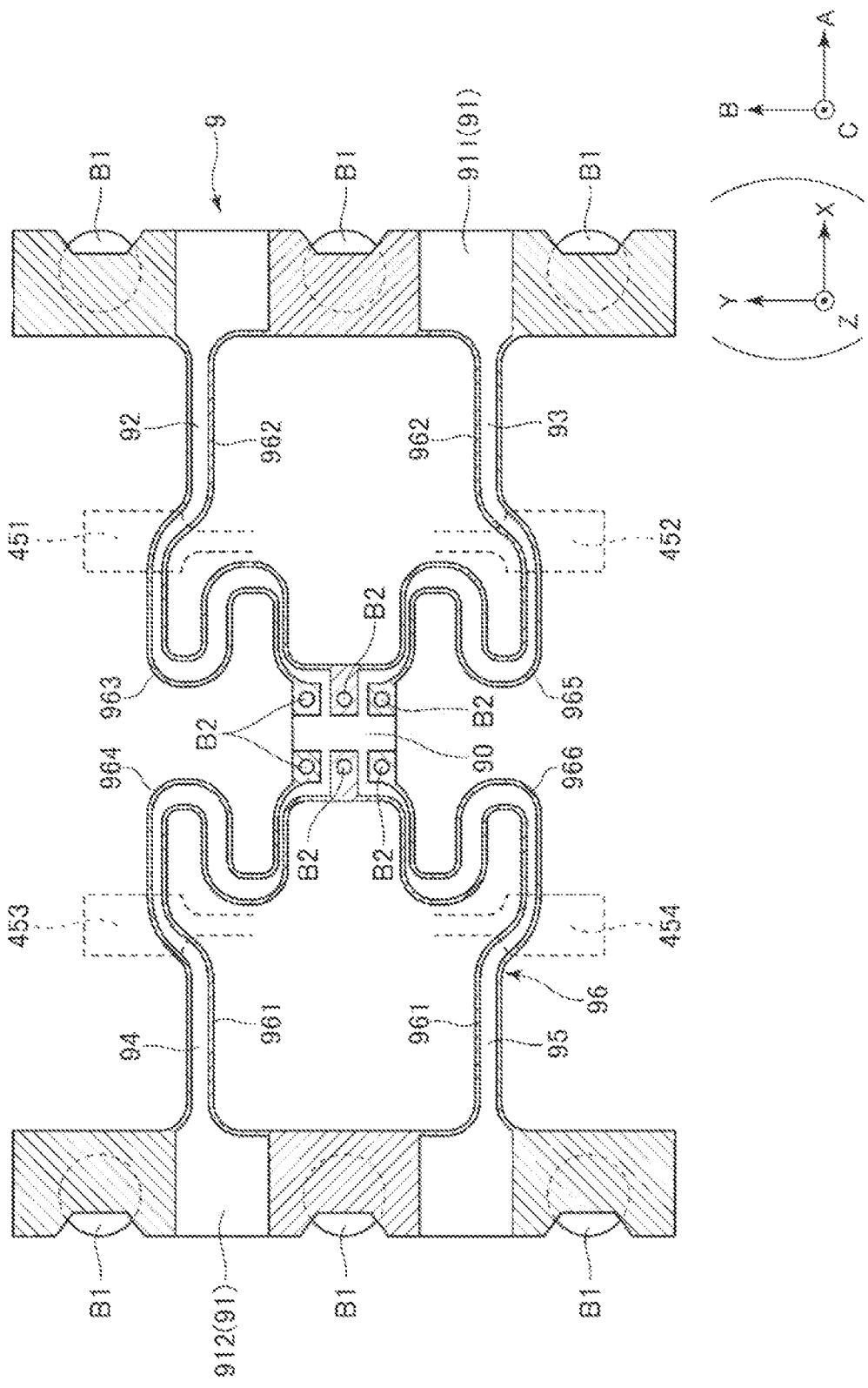
FIG. 22 is a plan view showing a support substrate provided to the vibrator device shown in FIG. 21.

FIG. 21 is a plan view showing a vibrator device according to a sixth embodiment. FIG. 22 is a plan view showing a support substrate provided to the vibrator device shown in FIG. 21.

The present embodiment is substantially the same as the first embodiment described above except the point that the configuration of a support substrate 9 is different. It should be noted that in the following description, the present embodiment will be described with a focus on the difference from the first embodiment described above, and the description of substantially the same issues will be omitted. Further, in FIG. 21 and FIG. 22, the constituents substantially the same as those of the embodiment described above are denoted by the same reference symbols.

As shown in FIG. 21 and FIG. 22, the support substrate 9 has a base 90, a support part 91, a pair of beam parts 92, 93, and a pair of beam parts 94, 95 wherein the support part 91 supports the base 90, and is provided with a first support part 911 and a second support part 912 disposed so as to be separated from each other on both sides along the A axis across the base 90, the pair of beam parts 92, 93 couple the base 90 and the first support part 911 to each other, and the pair of beam parts 94, 95 couple the base 90 and the second support part 912 to each other. Further, the base part 42 of the vibrator element 4 is fixed to the base 90 via the bonding members B2 having electrical conductivity, and the first support part 911 and the second support part 912 are each fixed to the bottom surface of the recess 311a via the bonding member B1.

As shown in FIG. 22, the beam parts 92, 93, 94, and 95 each have a portion meandering to form an S-shape in the middle thereof, and each form a shape easy to elastically deform in a direction along the A axis and a direction along the B axis. By the beam parts 92 through 95 deforming in the direction along the A axis and the direction along the B axis, it is possible to effectively absorb or relax the stress propagating from the base 31. It should be noted that the shapes of the beam parts 92 through 95 are each not particularly limited, but can be provided with, for example, a straight shape with the meandering portion omitted. Further, it is possible for at least one of the beam parts 92 through 95 to be different in shape from the others.

Further, in the plan view from the direction along the C axis, the drive arm 451 of the vibrator element 4 overlaps the beam part 92, the drive arm 452 overlaps the beam part 93, the drive arm 453 overlaps the beam part 94, and the drive arm 454 overlaps the beam part 95. Therefore, when the drive arms 451 through 454 are distorted in a direction along the C axis due to an impact or the like, the drive arms 451 through 454 have contact with the beam parts 92 through 95 to thereby be prevented from being further distorted excessively. In other words, the beam parts 92 through 95 function as stoppers for preventing the drive arms 451 through 454 from excessively deforming in the direction along the C axis. Thus, it is possible to prevent breakage of the vibrator element 4.

Such a support substrate 9 is formed of a quartz crystal substrate. By forming the support substrate 9 of the quartz crystal substrate similarly to the vibrating body 41 as described above, it is possible to make the support substrate 9 and the vibrating body 41 equal in thermal expansion coefficient to each other. Therefore, the thermal stress caused by the difference in thermal expansion coefficient between the support substrate 9 and the vibrating substrate 41 does not substantially occur, and it becomes more difficult for the vibrator element 4 to be subjected to stress. Therefore, it is possible to more effectively prevent the degradation and the fluctuation of the vibration characteristics of the vibrator element 4.

In particular, the support substrate 9 is formed of the quartz crystal substrate with the same cutting angle as that in the vibrating body 41. In the present embodiment, since the vibrating body 41 is formed of a Z-cut quartz crystal substrate, the support substrate 9 is also the Z-cut quartz crystal substrate. Further, the directions of the crystal axes of the support substrate 9 coincide with the directions of the crystal axes of the vibrating body 41. In other words, the support substrate 9 and the vibrating body 41 coincide with each other in the X axis, the Y axis, and the Z axis. Since the quartz crystal is different in thermal expansion coefficient between the direction along the X axis, the direction along the Y axis, and the direction along the Z axis, by making the support substrate 9 and the vibrating body 41 the same in cutting angle to uniform the directions of the crystal axes, it becomes more difficult for the thermal stress described above to occur between the support substrate 9 and the vibrating body 41. Therefore, it becomes more difficult for the vibrator element 4 to be subjected to stress, and thus, it is possible to more effectively prevent the degradation and the fluctuation of the vibration characteristics of the vibrator element 4.

It should be noted that the support substrate 9 is not limited thereto, but can also be different in directions of the crystal axes from the vibrating body 41 although the same in cutting angle as the vibrating body 41. Further, the support substrate 9 can also be formed of a quartz crystal substrate different in cutting angle from the vibrating body 41. Further, the support substrate 9 is not required to be formed of the quartz crystal substrate. In this case, it is preferable for the constituent material of the support substrate 9 to be a material having a difference in thermal expansion coefficient from the quartz crystal smaller than a difference in thermal expansion coefficient between the quartz crystal and the constituent material of the base 31.

Further, on the support substrate 9, there are disposed interconnections 96 for electrically coupling the vibrator element 4 and the internal terminals 341 to each other. The interconnections 96 include a drive signal interconnection 961, a drive ground interconnection 962, a first detection signal interconnection 963, a first detection ground interconnection 964, a second detection signal interconnection 965 and a second detection ground interconnection 966 wherein the drive signal interconnection 961 electrically couples the terminal 491 and the internal terminal 341 to each other, the drive ground interconnection 962 electrically couples the terminal 492 and the internal terminal 341 to each other, the first detection signal interconnection 963 electrically couples the terminal 493 and the internal terminal 341 to each other, the first detection ground interconnection 964 electrically couples the terminals 494 and the internal terminal 341 to each other, the second detection signal interconnection 965 electrically couples the terminal 495 and the internal terminal 341 to each other, and the second detection ground interconnection 966 electrically couples the terminal 496 and the internal terminal 341 to each other.

Further, the drive signal interconnection 961 is laid around to the base 90 and the second support part 912 passing the beam parts 94, 95, and the drive ground interconnection 962 is laid around to the base 90 and the first support part 911 passing the beam parts 92, 93. Further, the first detection signal interconnection 963 is laid around to the base 90 and the first support part 911 passing the beam part 92, and the first detection ground interconnection 964 is laid around to the base 90 and the second support part 912 passing the beam part 94. Further, the second detection signal interconnection 965 is laid around to the base 90 and the first support part 911 passing the beam part 93, and the second detection ground interconnection 966 is laid around to the base 90 and the second support part 912 passing the beam part 95.

In such a configuration, in the plan view from the direction along the C axis, the first detection signal interconnection 963 passing the beam part 92 has a portion overlapping the drive arm 451 in a crossing manner, the second detection signal interconnection 965 passing the beam part 93 has a portion overlapping the drive arm 452 in a crossing manner. Therefore, similarly to the first embodiment described above, the drive ground electrode 482 on the drive arms 451, 452 functions as the shield layer, and it is possible to prevent the noise interference between the drive signal electrode 481 on the drive arms 451, 452 and the first and second detection signal interconnections 963, 965, respectively.

According also to such a sixth embodiment as described above, substantially the same advantages as in the first embodiment described above can be exerted.

Seventh Embodiment

Figure 23:
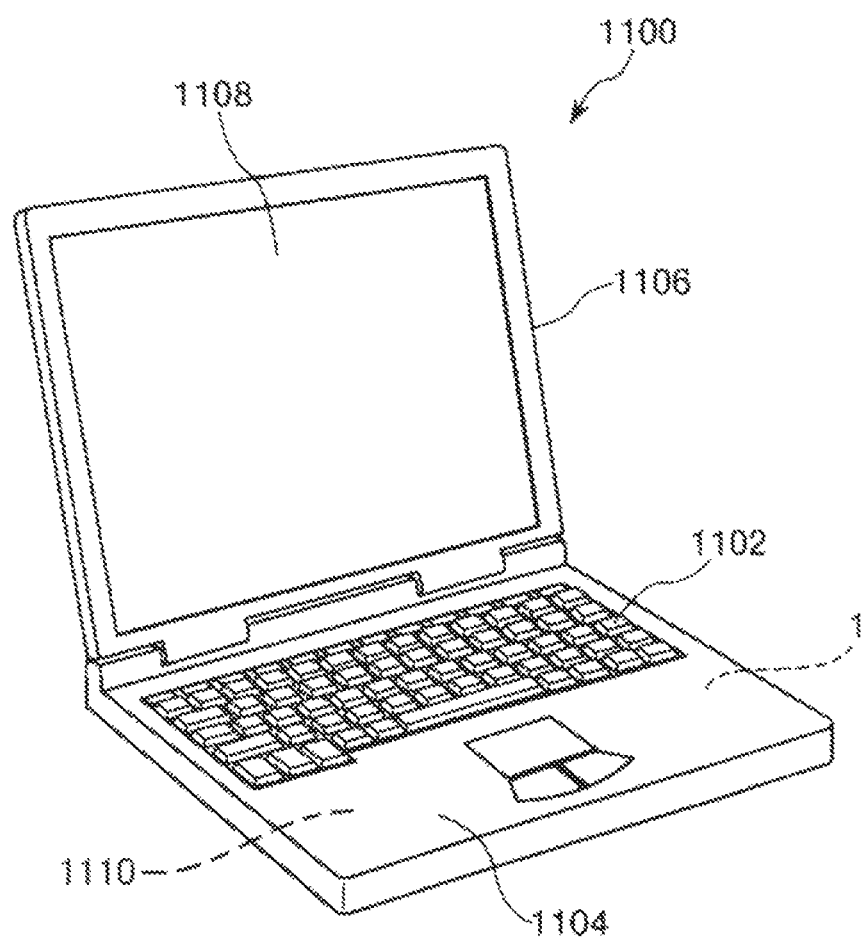
FIG. 23 is a perspective view showing a personal computer according to a seventh embodiment.

FIG. 23 is a perspective view showing a personal computer according to a seventh embodiment.

The personal computer 1100 as the electronic apparatus shown in FIG. 23 is constituted by a main body section 1104 equipped with a keyboard 1102, and a display unit 1106 equipped with a display section 1108, and the display unit 1106 is pivotally supported with respect to the main body section 1104 via a hinge structure. Further, the personal computer 1100 incorporates the vibrator device 1 as a physical quantity sensor, and a signal processing circuit 1110 for performing signal processing, namely control of each section, based on an output signal from the vibrator device 1.

As described above, the personal computer 1100 as the electronic apparatus is provided with the vibrator device 1, and the signal processing circuit 1110 for performing the signal processing based on the output signal of the vibrator device 1. Therefore, it is possible to appreciate the advantages of the vibrator device 1 described above, and the high reliability can be exerted.

Eighth Embodiment

Figure 24:
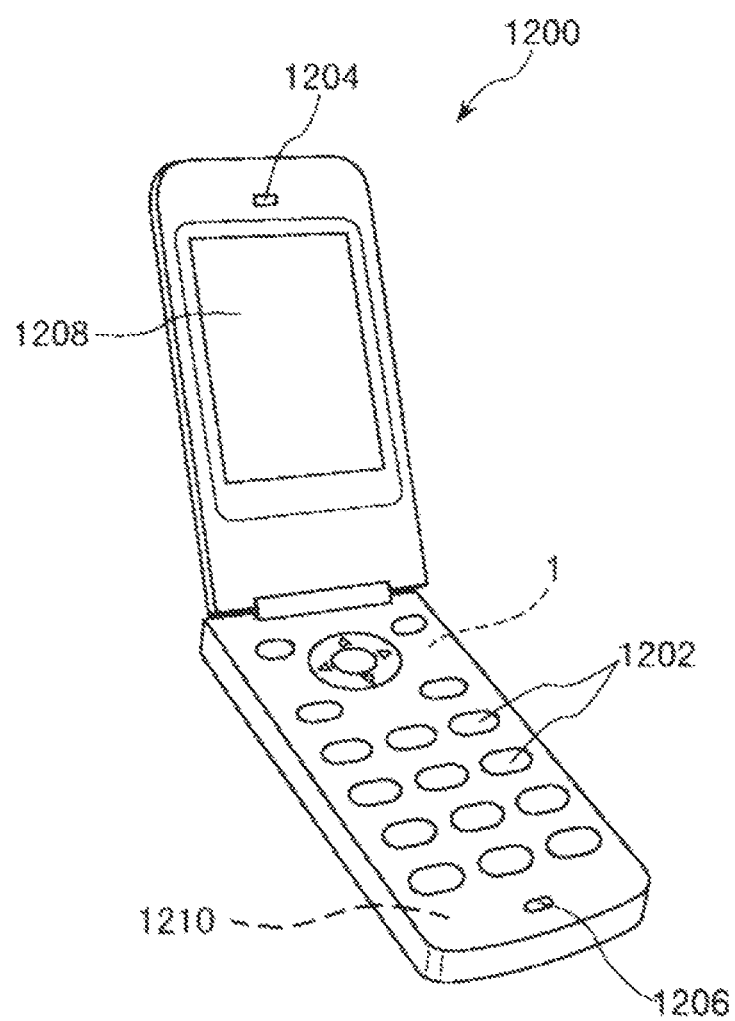
FIG. 24 is a perspective view showing a cellular phone according to an eighth embodiment.

FIG. 24 is a perspective view showing a cellular phone according to an eighth embodiment.

The cellular phone 1200 as the electronic apparatus shown in FIG. 24 is provided with an antenna not shown, a plurality of operation buttons 1202, an ear piece 1204, and a mouthpiece 1206, and a display section 1208 is disposed between the operation buttons 1202 and the ear piece 1204. Further, the cellular phone 1200 incorporates the vibrator device 1 as a physical quantity sensor, and a signal processing circuit 1210 for performing signal processing, namely control of each section, based on the output signal from the vibrator device 1.

As described above, the cellular phone 1200 as the electronic apparatus is provided with the vibrator device 1, and the signal processing circuit 1210 for performing the signal processing based on the output signal of the vibrator device 1. Therefore, it is possible to appreciate the advantages of the vibrator device 1 described above, and the high reliability can be exerted.

Ninth Embodiment

Figure 25:
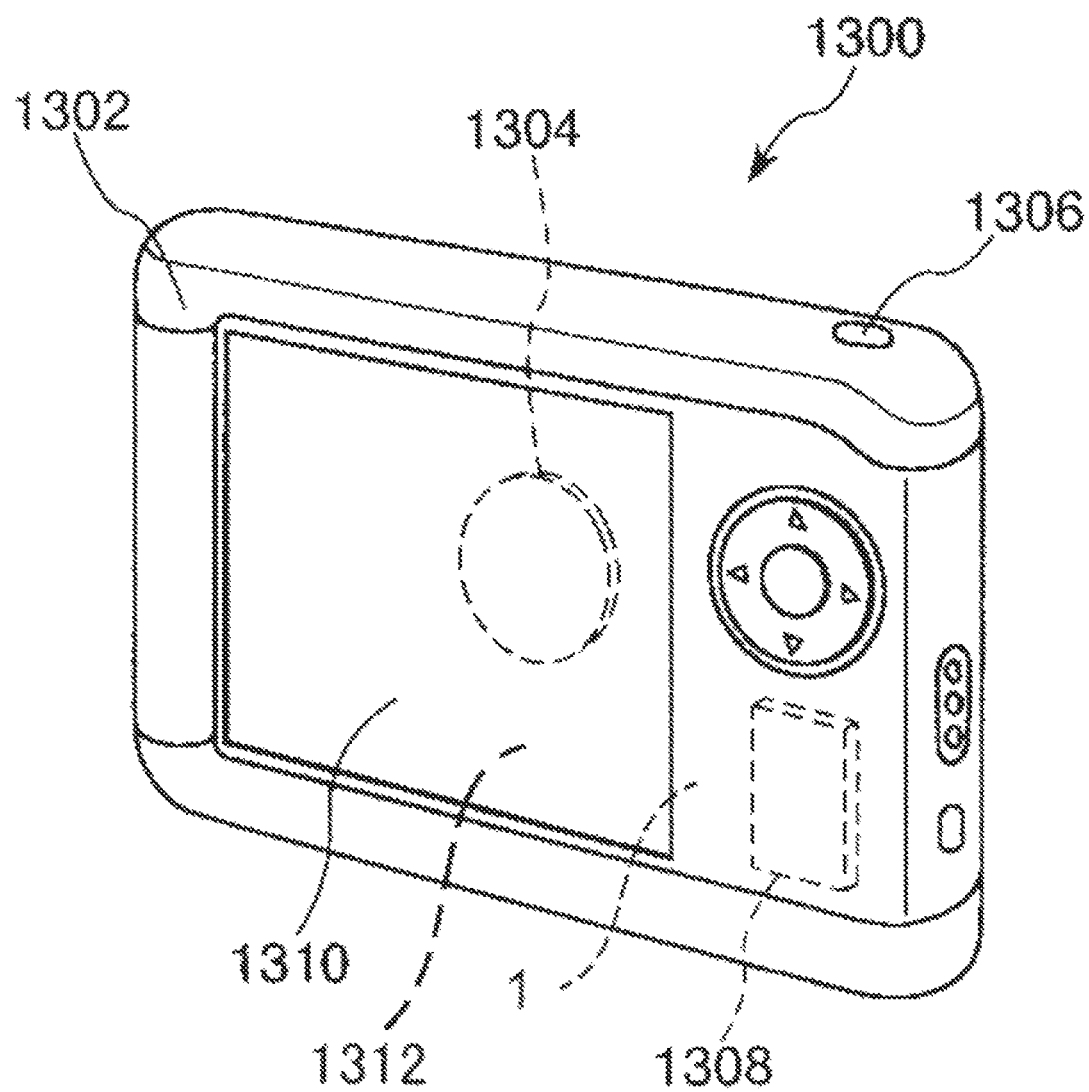
FIG. 25 is a perspective view showing a digital still camera according to a ninth embodiment.

FIG. 25 is a perspective view showing a digital still camera according to a ninth embodiment.

The digital still camera 1300 as the electronic apparatus shown in FIG. 25 is provided with a case 1302, and on a back surface of the case 1302, there is disposed a display section 1310. The display section 1310 is provided with a configuration of performing display based on an imaging signal due to a CCD, and functions as a finder for displaying the photographic subject as an electronic image. Further, on the front side of the case 1302, there is disposed a light receiving unit 1304 including an optical lens, the CCD, and so on. Then, when the photographer checks an object image displayed on the display 1310, and then presses a shutter button 1306, the imaging signal from the CCD at that moment is transferred to and stored in a memory 1308. Further, the digital still camera 1300 incorporates the vibrator device 1 as a physical quantity sensor, and a signal processing circuit 1312 for performing signal processing, namely control of each section, based on the output signal from the vibrator device 1.

As described above, the digital still camera 1300 as the electronic apparatus is provided with the vibrator device 1, and the signal processing circuit 1312 for performing the signal processing based on the output signal of the vibrator device 1. Therefore, it is possible to appreciate the advantages of the vibrator device 1 described above, and the high reliability can be exerted.

It should be noted that the electronic apparatus equipped with the vibrator device 1 can also be, for example, a smartphone, a tablet terminal, a timepiece including a smart watch, an inkjet type ejection device such as an inkjet printer, a wearable terminal such as an HMD (a headmounted display) and a pair of smart glasses, a television set, a video camera, a video cassette recorder, a car navigation system, a pager, a personal digital assistance, an electronic dictionary, an electronic translator, an electronic calculator, a computerized game machine, training equipment, a word processor, a workstation, a video phone, a security video monitor, a pair of electronic binoculars, a POS terminal, medical equipment such as an electronic thermometer, an electronic manometer, an electronic blood sugar meter, an electrocardiogram measurement instrument, an ultrasonograph, and an electronic endoscope, a fish detector, a variety of types of measurement instruments, a variety of types of gauges to be installed in a car, an aircraft, a ship, or a boat, a base station for mobile terminals, and a flight simulator, besides the personal computer 1100, the mobile phone 1200, and the digital still camera 1300 described above.

Tenth Embodiment

Figure 26:
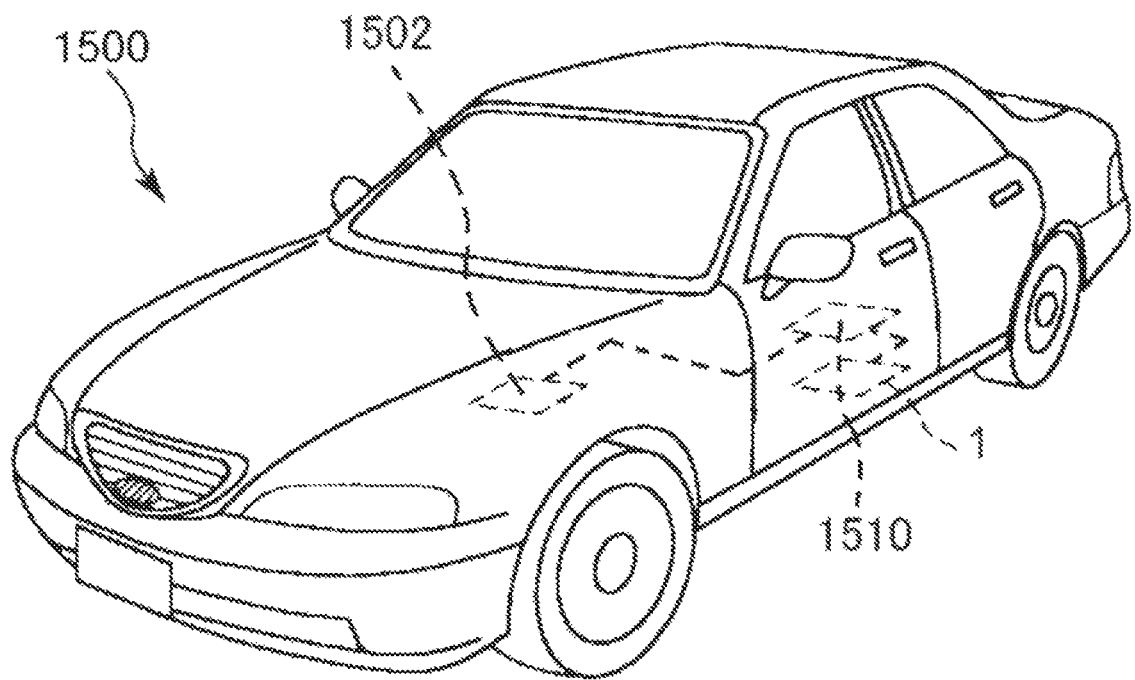
FIG. 26 is a perspective view showing a car according to a tenth embodiment.

FIG. 26 is a perspective view showing a car according to a tenth embodiment.

The car 1500 as the vehicle shown in FIG. 26 includes a system 1502 such as an engine system, a brake system, a steering system, an attitude control system, or a keyless entry system. Further, the car 1500 incorporates the vibrator device 1 as a physical quantity sensor, and a signal processing circuit 1510 for performing signal processing, namely control of the system 1502, based on the output signal from the vibrator device 1.

As described above, the car 1500 as the vehicle is provided with the vibrator device 1, and the signal processing circuit 1510 for performing the signal processing based on the output signal (an oscillation signal) of the vibrator device 1. Therefore, it is possible to appreciate the advantages of the vibrator device 1 described above, and the high reliability can be exerted.

It should be noted that the vehicle equipped with the vibrator device 1 can also be, for example, a robot, a drone, an electric wheelchair, a two-wheeled vehicle, an airplane, a helicopter, a ship, a boat, an electric train, a monorail, a cargo-carrying vehicle, a rocket, or a space vehicle besides the car 1500.

Although the vibrator device, the electronic apparatus, and the vehicle according to the present disclosure are described based on the illustrated embodiments, the present disclosure is not limited thereto, but the configuration of each of the sections can be replaced with an arbitrary configuration having substantially the same function. Further, the present disclosure can also be added with any other constituents. Further, it is also possible to arbitrarily combine any of the embodiments with each other.

What is claimed is:

1. A vibrator device comprising:
a support substrate including a support base and a support part connected to the support base via a beam, the support base, the beam, and the support part being a monolithic structure, only the support part being connected to a package base to support an entirety of the support substrate; and
a vibrator element including an element base and a drive arm, the element base being connected to the support base, the drive arm having first and second surfaces outwardly opposite to each other, the first surface facing the support substrate,
wherein the drive arm includes:
a drive constant-potential electrode arranged on the first surface; and
a drive signal electrode arranged on only the second surface.

2. The vibrator device according to claim 1, wherein the vibrator element includes a detection arm, and the detection arm includes:
a detection signal electrode; and
a detection constant-potential electrode.

3. The vibrator device according to claim 1, wherein the support substrate includes an interconnection which is electrically connected to the vibrator element.

4. The vibrator device according to claim 3, wherein the interconnection includes a detection signal interconnection that is electrically connected to the detection signal electrode, and
the detection signal interconnection is provided on the beam.

5. The vibrator device according to claim 4, wherein the detection signal interconnection overlaps the drive constant-potential electrode in a plan view.

6. The vibrator device according to claim 5, wherein the support part includes a first support part and a second support part,
the support base is arranged between the first support part and the second support part in the plan view, and
the beam includes:
a first beam part connecting the base and the first support part; and
a second beam part connecting the base and the second support part.

7. The vibrator device according to claim 6, wherein the interconnection includes:
a drive constant-potential interconnection electrically connected to the drive constant-potential electrode; and
a drive signal interconnection electrically connected to the drive signal electrode,
the drive constant-potential interconnection is provided on the first beam part,
the drive signal interconnection is provided on the second beam part, and
the detection signal interconnection is provided on the first beam part.

8. An electronic apparatus comprising:
vibrator device according to claim 1; and
a signal processing circuit configured to perform signal processing based on an output signal of the vibrator device.

9. A vehicle comprising:
a movable body;
the vibrator device according to claim 1, the vibrator device being housed in the movable body; and
a signal processing circuit configured to perform signal processing based on an output signal of the vibrator device.

* * * * *